US012634149B2

(12) United States Patent
Jung et al.

(10) Patent No.: US 12,634,149 B2
(45) Date of Patent: May 19, 2026

(54) AUTHENTICATION METHOD AND APPARATUS FOR SATELLITE NAVIGATION MESSAGE AND CORRECTION MESSAGES

(71) Applicant: ELECTRONICS AND TELECOMMUNICATIONS RESEARCH INSTITUTE, Daejeon (KR)

(72) Inventors: Won Chan Jung, Daejeon (KR); Taenam Cho, Jincheon-gun (KR); Seunglim Yong, Incheon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 18/295,107

(22) Filed: Apr. 3, 2023

(65) Prior Publication Data

US 2023/0318849 A1     Oct. 5, 2023

(30) Foreign Application Priority Data

Apr. 4, 2022     (KR) ........................ 10-2022-0041773
Mar. 20, 2023     (KR) ........................ 10-2023-0035964

(51) Int. Cl.
*H04L 9/32* (2006.01)
*G01S 19/02* (2010.01)
(Continued)

(52) U.S. Cl.
CPC ............ *H04L 9/3247* (2013.01); *G01S 19/02* (2013.01); *G01S 19/215* (2013.01);
(Continued)

(58) Field of Classification Search
None
See application file for complete search history.

(56) References Cited

U.S. PATENT DOCUMENTS

| 6,850,187 | B1 * | 2/2005 | Clark | ...................... G01S 19/10 |
| | | | | 455/12.1 |
| 11,445,373 | B1 * | 9/2022 | O'Connor | ............ H04L 9/3247 |

(Continued)

FOREIGN PATENT DOCUMENTS

| JP | 2017525199 A | 8/2017 |
| KR | 20160040180 A | 4/2016 |

(Continued)

OTHER PUBLICATIONS

Wu et al. "ECDSA-Based Message Authentication Scheme for BeiDou-II Navigation Satellite System," Aug. 2019, IEEE Transactions on Aerospace and Electronic Systems, vol. 55, No. 4, pp. 1666-1682, DOI: 10.1109/TAES.2018.2874151. (Year: 2019).*

(Continued)

*Primary Examiner* — Philip J Chea
*Assistant Examiner* — Bin Qing Zheng
(74) *Attorney, Agent, or Firm* — Rabin & Berdo, P.C.

(57) ABSTRACT

A satellite navigation system-based authentication method includes receiving a first message, receiving a second message which includes first authentication information and second authentication information via channel which is differ from channel where the first message is transmitted, authenticating the first message by using the first authentication information; and authenticating the second message by using the second authentication information.

8 Claims, 20 Drawing Sheets

(51) Int. Cl.
    *G01S 19/07*        (2010.01)
    *G01S 19/21*        (2010.01)
    *H04L 9/40*        (2022.01)

(52) U.S. Cl.
    CPC .......... *H04L 9/3215* (2013.01); *H04L 63/123*
              (2013.01); *G01S 19/07* (2013.01)

(56)         References Cited

U.S. PATENT DOCUMENTS

| | | | |
|---|---|---|---|
| 12,028,714 B1 * | 7/2024 | Gutt | G01S 19/05 |
| 2013/0060955 A1 * | 3/2013 | Enge | H04W 12/12 |
| | | | 709/229 |
| 2015/0074414 A1 | 3/2015 | Kim | |
| 2015/0229479 A1 | 8/2015 | Cho et al. | |
| 2019/0120970 A1 * | 4/2019 | Vigen | G01S 19/215 |

FOREIGN PATENT DOCUMENTS

| | | |
|---|---|---|
| KR | 101909745 B1 | 10/2018 |
| KR | 102219617 B1 | 2/2021 |
| KR | 102294335 B1 | 8/2021 |
| KR | 102307770 B1 | 10/2021 |
| WO | 2022063714 A2 | 3/2022 |

OTHER PUBLICATIONS

Wu et al. "ECDSA-Based Message Authentication Scheme for BeiDou-Il Navigation Satellite System," Aug. 2019, IEEE Transactions on Aerospace and Electronic Systems, vol. 55, No. 4, pp. 1666-1682, Doi: 10.1109/TAES.2018.2874151. (Year: 2019).*

Quasi-Zenith Satellite System Interface Specification Centimeter Level Augmentation Service, IS-QZSS-L6-004, Jul. 14, 2021.

A. Dinesh Manandhar et al., "Authenticating GALILEO Open Signal Using QZSS Signal", 31st International Technical Meeting of the Satellite Division of the Institute of Navigation (ION GNSS+ 2018), Sep. 24-28, 2018.

Zhijun Wu et al., "ECDSA-Based Message Authentication Scheme for BeiDou II Navigation Satellite System", IEEE Transactions on Aerospace and Electronic Systems vol. 55, No. Aug. 4, 2019.

* cited by examiner

Start

2410

Generate first authentication information to perform authentication on first message

2430

Generate second authentication information to perform authentication on second message

2450

Include first authentication information and second authentication information in second message and transmit second message End

2500

Memory
2510

Processor
2530

AUTHENTICATION METHOD AND APPARATUS FOR SATELLITE NAVIGATION MESSAGE AND CORRECTION MESSAGES

CROSS-REFERENCE TO RELATED APPLICATION(S)

This application claims the priority benefit of Korean Patent Application No. 10-2022-0041773 filed on Apr. 4, 2022, and Korean Patent Application No. 10-2023-0035964 filed on Mar. 20, 2023, in the Korean Intellectual Property Office, the disclosures of which are incorporated herein by reference for all purposes.

BACKGROUND

1. Field

The present disclosure relates to a satellite navigation system-based message authentication method and an apparatus for performing the same.

2. Description of Related Art

Research on authentication technology for satellite navigation messages and against the risk of spoofing attacks has been underway with the growth of services using satellite navigation messages. The proposed methods vary depending on the satellites of respective countries because the technology may vary depending on the features of the satellites. Only Galileo of Europe is currently being pilot operated, but there are plans of proposing authentication methods for other satellites and applying the methods to those satellites.

The above description has been possessed or acquired by the inventor(s) in the course of conceiving the present disclosure and is not necessarily an art publicly known before the present application is filed.

SUMMARY

An aspect provides technology for performing various types of navigation message authentication to correspond to a structure of satellite messages.

Another aspect also provides technology for an authentication method of transmitting authentication of a satellite navigation message transmitted at a low speed by including it in a precise correction message transmitted at a high speed.

Another aspect also provides technology for fast authentication in a high-precision navigation service which needs to receive both a satellite navigation message and a precision correction message.

According to aspects, an authentication method may be selected as needed, and authentication may be performed.

According to aspects, an applied hash function, a digital signature algorithm, and the length of a key may be selectively used.

However, technical aspects are not limited to the foregoing aspects, and there may be other technical aspects.

According to an aspect, there is provided a satellite navigation system-based authentication method including receiving a first message, receiving a second message which includes first authentication information and second authentication information via channel which is differ from channel where the first message is transmitted, authenticating the first message by using the first authentication information, and authenticating the second message by using the second authentication information.

The first message may be a message transmitted at a low speed and the second message may be a message transmitted at a high speed.

The first message may include a navigation message and the second message may include a precise correction message.

A subframe of the first message may include a field for synchronizing the second message with the subframe, and a subframe of the second message may include a data part including the first authentication information and the second authentication information.

The first authentication information may include a digital signature for the first message and the second authentication information may include a digital signature for the second message.

An odd-numbered subframe of subframes included by the second message may include authentication information on the odd-numbered subframe, and an even-numbered subframe of the subframes included by the second message may include a concatenation of authentication information on a subframe corresponding to the even-numbered subframe of the subframes included by the first message and authentication information on the even-numbered subframe.

An even-numbered subframe of subframes included by the second message may include authentication information on a subframe corresponding to the even-numbered subframe of the subframes included by the first message, and an odd-numbered subframe of the subframes included by the second message may include a concatenation of the even-numbered subframe and the odd-numbered subframe.

An odd-numbered subframe of subframes included by the second message may include authentication information on the odd-numbered subframe, and an even-numbered subframe of the subframes included by the second message may include authentication information on a concatenation or an exclusive-or of the even-numbered subframe and a subframe corresponding to the even-numbered subframe of subframes included by the first message.

According to an aspect, there is provided an apparatus configured to perform a satellite navigation system-based authentication method including a memory including instructions and a processor electrically connected to the memory and configured to execute the instructions, in which the processor performs a plurality of operations when the instructions are executed by the processor, and the operations include receiving a first message, receiving a second message which includes first authentication information and second authentication information via channel which is differ from channel where the first message is transmitted, authenticating the first message by using the first authentication information, and authenticating the second message by using the second authentication information.

The first message may be a message transmitted at a low speed and the second message may be a message transmitted at a high speed.

The first message may include a navigation message and the second message may include a precise correction message.

A subframe of the first message may include a field for synchronizing the second message with the subframe, and a subframe of the second message may include a data part including the first authentication information and the second authentication information.

The first authentication information may include a digital signature for the first message and the second authentication information may include a digital signature for the second message.

An odd-numbered subframe of subframes included by the second message may include authentication information on the odd-numbered subframe, and an even-numbered subframe of the subframes included by the second message may include a concatenation of authentication information on a subframe corresponding to the even-numbered subframe of the subframes included by the first message and authentication information on the even-numbered subframe.

An even-numbered subframe of subframes included by the second message may include authentication information on a subframe corresponding to the even-numbered subframe of the subframes included by the first message, and an odd-numbered subframe of the subframes included by the second message may include a concatenation of the even-numbered subframe and the odd-numbered subframe.

An odd-numbered subframe of subframes included by the second message may include authentication information on the odd-numbered subframe, and an even-numbered subframe of the subframes included by the second message may include authentication information on a concatenation or an exclusive-or of the even-numbered subframe and a subframe corresponding to the even-numbered subframe of subframes included by the first message.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
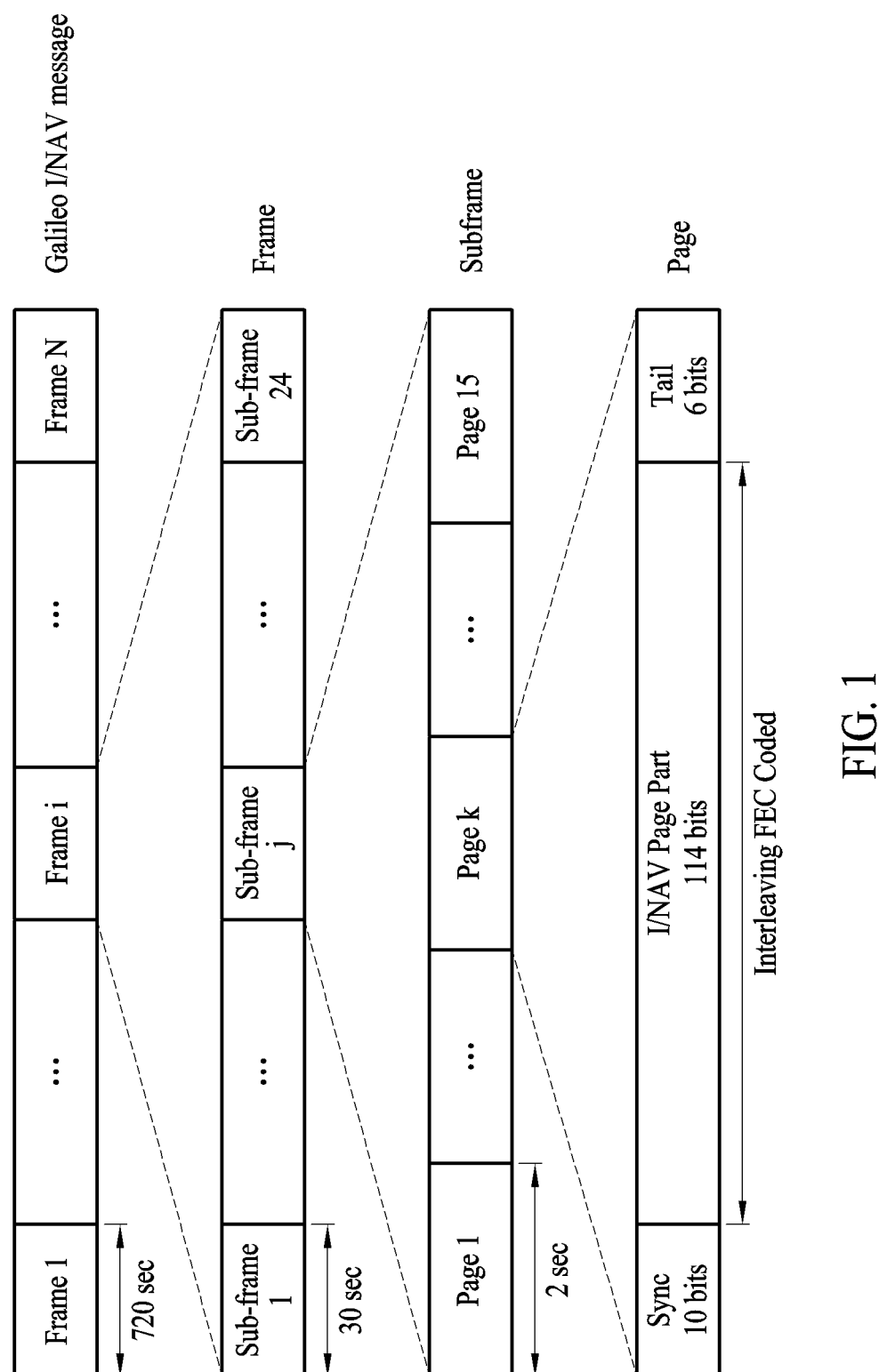
FIG. 1 illustrates a Galileo I/NAV message format.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the embodiments with reference to the accompanying drawings, like reference numerals refer to like elements and a repeated description related thereto will be omitted.

Figure 2:
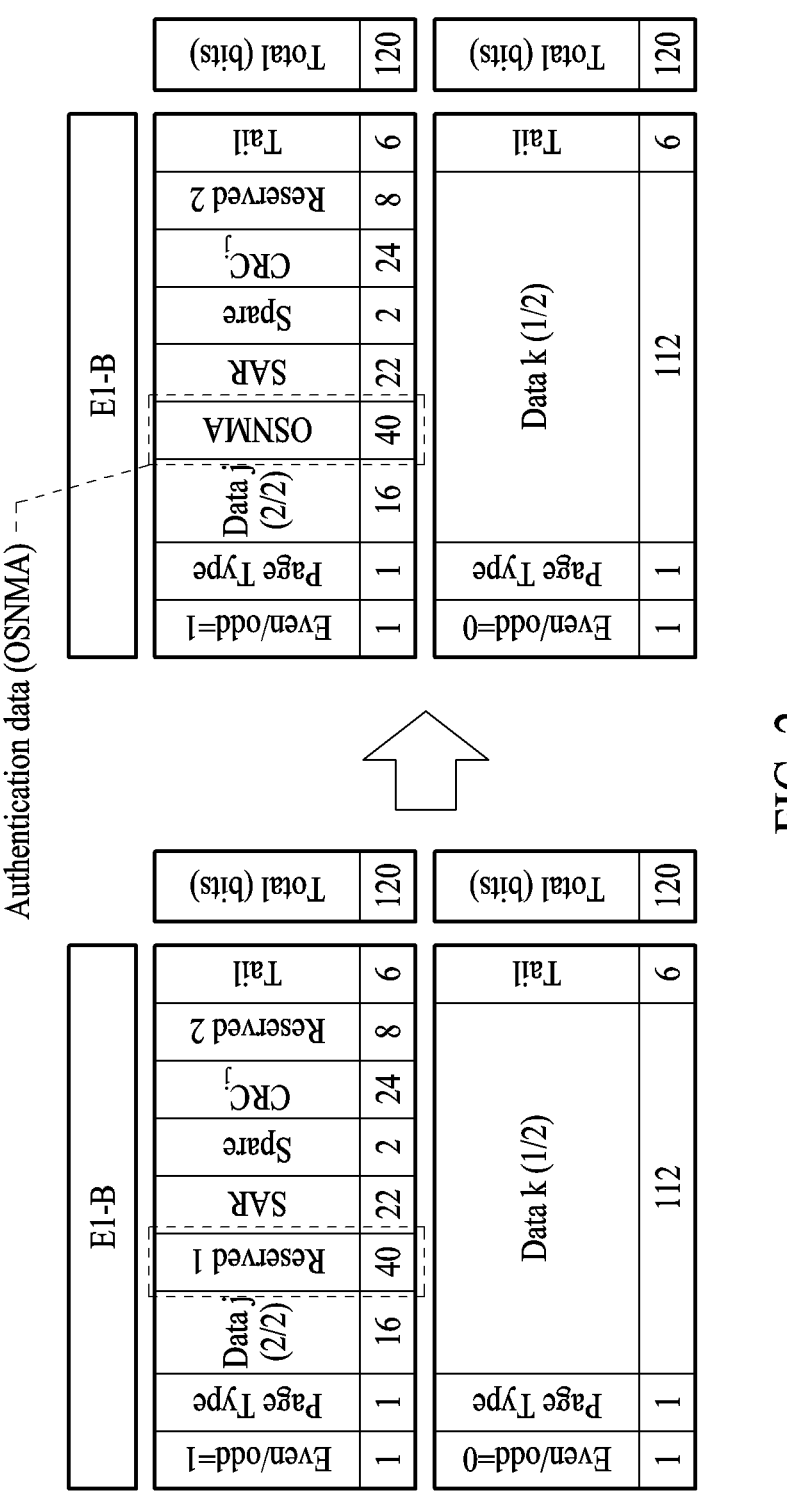
FIG. 2 illustrates a Galileo authentication data insertion position.
Figures 3, 4:
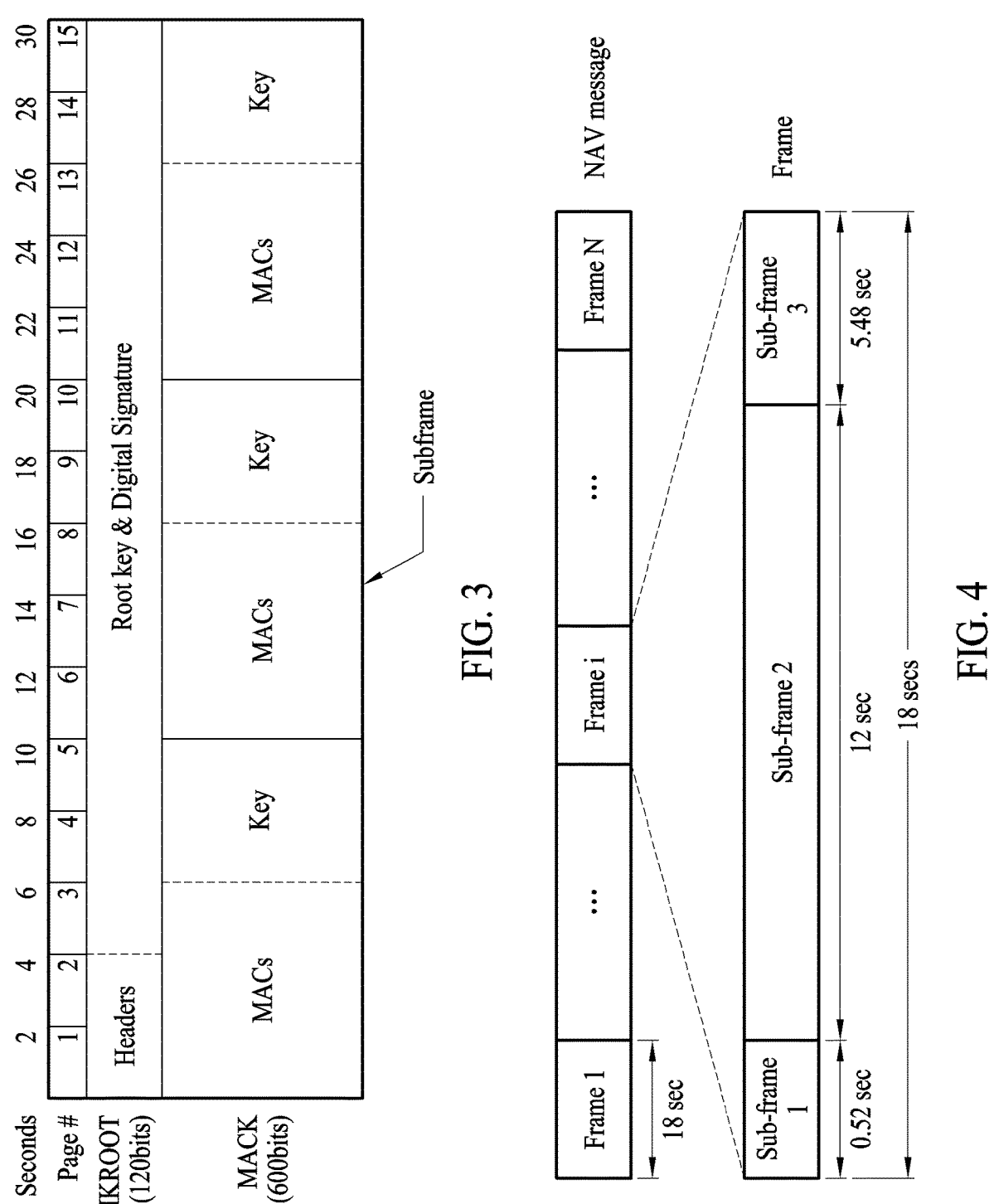
FIG. 3 illustrates an open service navigation message authentication (OSNMA) (authentication data) field configuration.
FIG. 4 illustrates a global positioning system (GPS) message structure.

FIGS. 1 to 3 are diagrams illustrating an authentication method of a European satellite navigation system (e.g., Galileo).

FIG. 1 illustrates a Galileo I/NAV message format, FIG. 2 illustrates a Galileo authentication data insertion position, and FIG. 3 illustrates an open service navigation message authentication (OSNMA) (authentication data) field configuration.

Referring to FIGS. 1 to 3, regarding Galileo of Europe, an authentication method for an I/NAV message, that is, a satellite navigation message transmitted through an E1B channel having a 125-bps transmission speed, is proposed.

As illustrated in FIG. 1, a Galileo I/NAV message may include N (e.g., a natural number greater than 1) frames. One frame may include 15 subframes. The authentication of a satellite navigation message of Galileo may be performed by dividing and transmitting authentication data (OSNMA) to reserved 40 bits of each subframe as illustrated in FIG. 2. A configuration of data transmitted to each subframe is as illustrated in FIG. 3. Message authentication may be performed through message authentication code (MAC) for a message. A secret key necessary for the MAC may be transmitted together with the MAC by using a Timed Efficient Stream Loss-Tolerant Authentication (TESLA) technique. Authentication of a root key of the TESLA technique may be performed through a digital signature. The message may be transmitted together with a MAC value of the message and a key value used for the previous MAC. A receiver (e.g., a receiving device) may authenticate a TESLA technique root key by using a digital signature and verify a MAC value of a previous message by using a key received together with a next message. Galileo is using a complex secret key encryption method instead of its short length due to limited data space.

Figure 5:
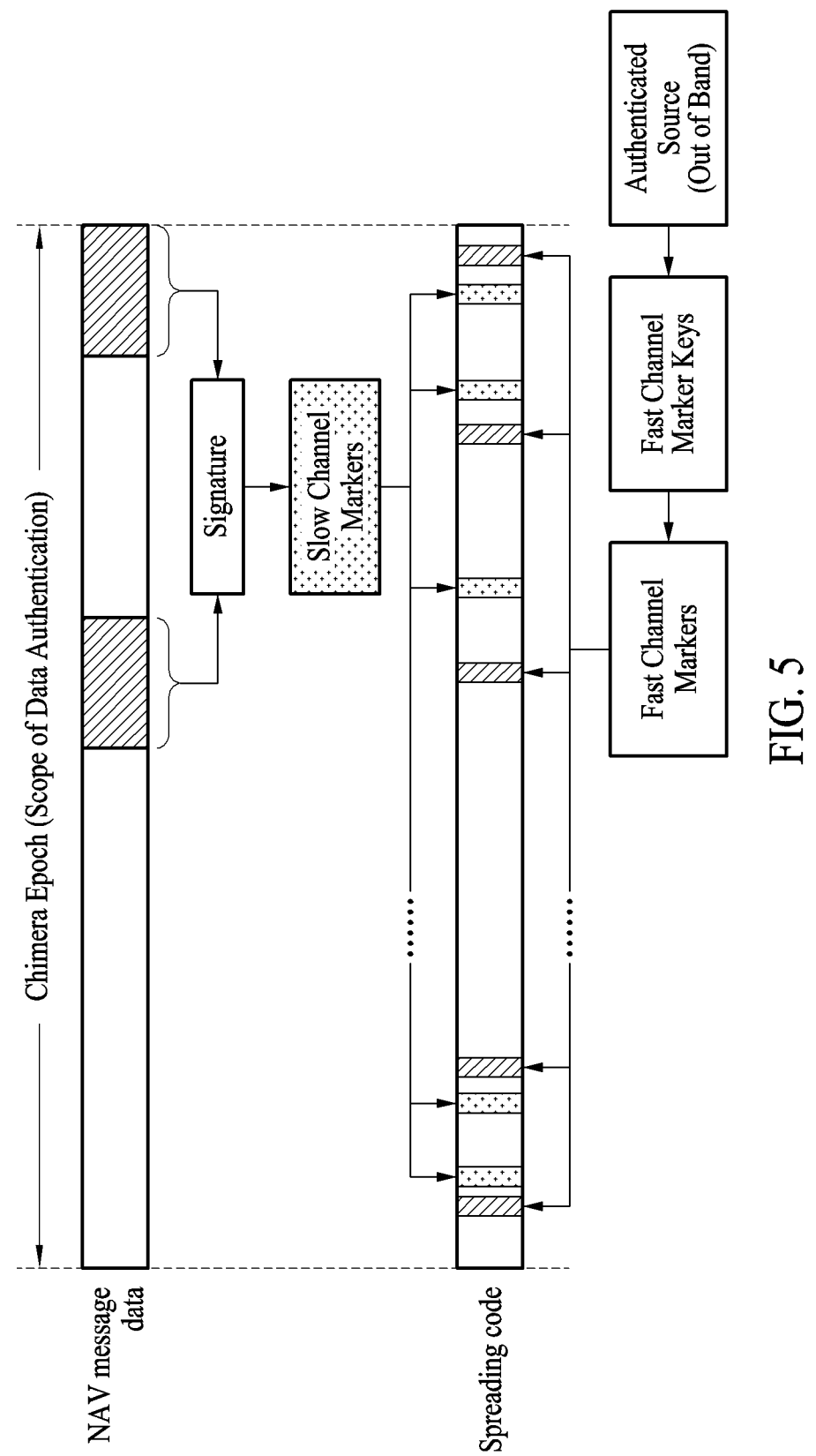
FIG. 5 illustrates a GPS satellite navigation message and a spreading code binding.
Figure 6:
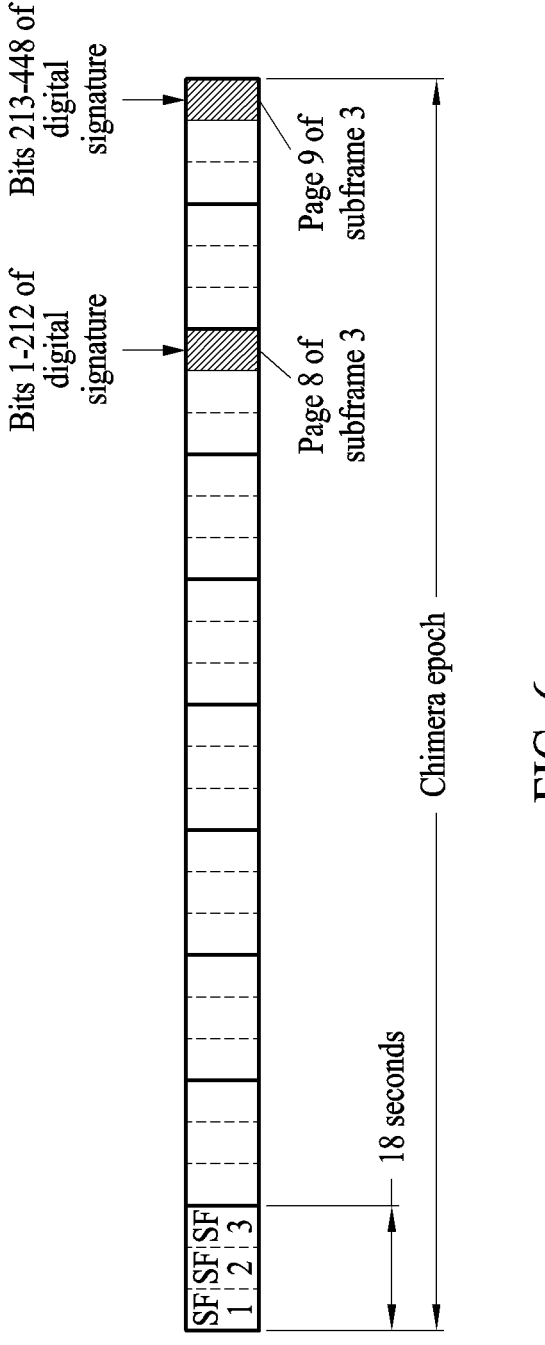
FIG. 6 illustrates a chips message robust authentication (Chimera) digital signature format.

FIGS. 4 to 6 are diagrams illustrating an authentication method based on a global positioning system (GPS) of the United States (US).

FIG. 4 illustrates a GPS message structure, FIG. 5 illustrates a GPS satellite navigation message and a spreading code binding, and FIG. 6 illustrates a chips message robust authentication (Chimera) digital signature format.

Referring to FIGS. 4 to 6, Chimera is proposed as an authentication method for a navigation message and spreading code transmitted through a CNAV-2 LIC channel in the US GPS.

Referring to FIG. 4, a navigation message transmitted through an LIC channel may include N (e.g., a natural number greater than 1) frames. One frame may include three subframes and be transmitted at 100 bps over 18 seconds.

Referring to FIG. 5, in Chimera, authentication may be performed with navigation message data and spreading code by being associated with each other. Authentication of the spreading code may be performed by verifying a marker (e.g., a slow channel marker or a fast channel marker) that has been inserted into the spreading code. Information on an inserted position of the marker and a value of the marker may be supported by a slow channel and a fast channel. The slow channel marker may be derived from a signature of navigation message data and the fast channel marker may be separately supported by an out-of-band authenticated source (e.g., the Internet).

Referring to FIG. 6, ten different pages are transmitted to a subframe 3 of a message transmitted through the LIC channel, and the order of the pages transmitted may vary. An epoch of transmitting 10 pages may be referred to as a Chimera epoch. Authentication may be performed by transmitting one signature value of 10 messages in each Chimera epoch. As illustrated in FIG. 6, a signature may be transmitted by being divided into pages 8 and 9 of the subframe 3. As described above, since the Chimera of the US GPS has a long transmission epoch of authentication information (e.g., a signature), an epoch of authentication may also be long.

FIGS. 7 to 12 are diagrams illustrating an authentication method based on a satellite navigation system (e.g., BeiDou) of China. China's BeiDou satellite system may include a geostationary earth orbit (GEO), a medium earth orbit (MEO), and an inclined geosynchronous orbit (IGSO). The MEO and the IGSO may use a D1 message format transmitted at 50 bps, and the GEO may use a D2 message format transmitted at 500 bps.

Figure 7:
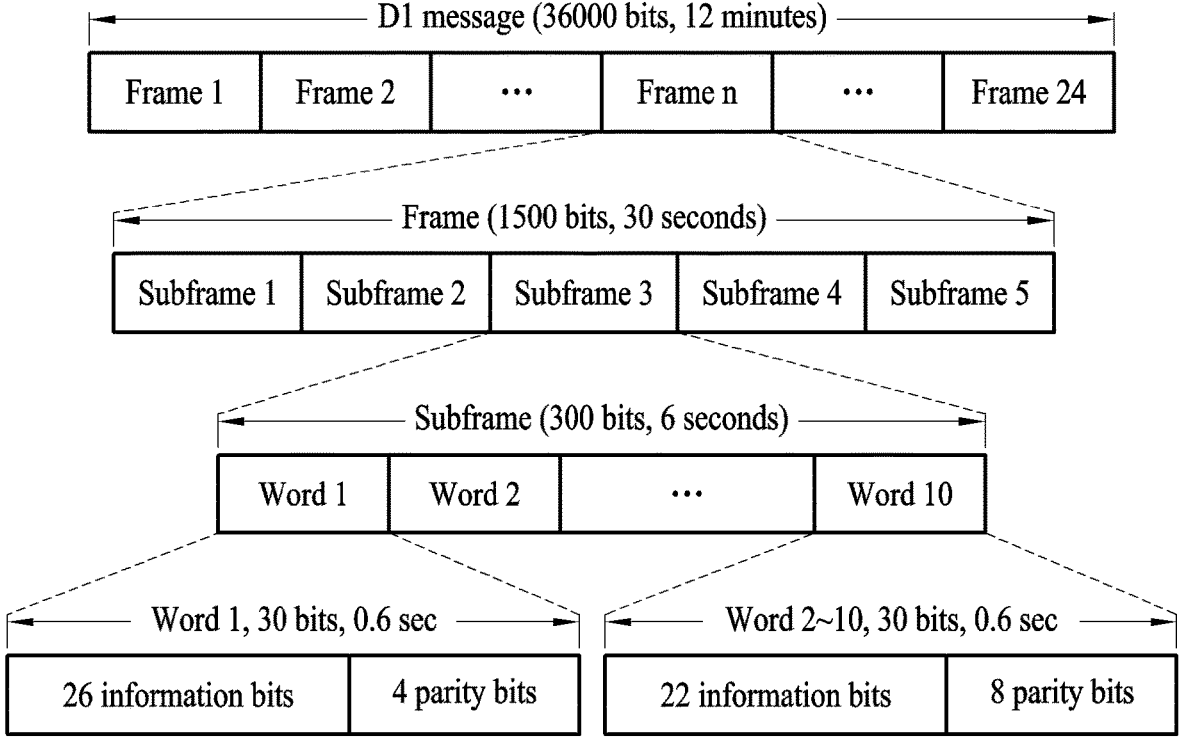
FIG. 7 illustrates a BeiDou D1 message format.

FIG. 7 illustrates a BeiDou D1 message (hereinafter, the D1 message) format.

Referring to FIG. 7, the D1 message may include 24 frames and be transmitted for 12 minutes. One frame of the D1 message may include 5 subframes.

Figure 8:
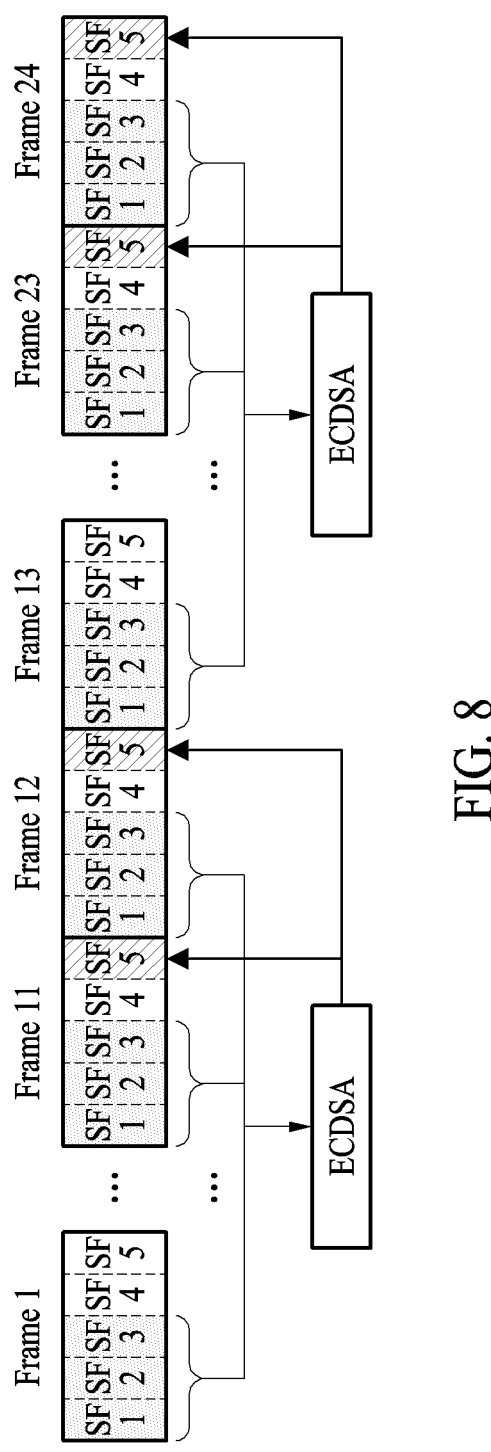
FIG. 8 illustrates a method of transmitting a signature for BeiDou D1.

FIG. 8 illustrates a method of transmitting a signature for BeiDou D1.

Referring to FIG. 8, the D1 message may include basic navigation information (BNI) in three subframes (e.g., subframes 1, 2, and 3) among five subframes. In the authentication method of the D1 message, authentication information (e.g., a signature) on the BNI may be transmitted once in every 24 frames. A signature (e.g., a signature generated by using an elliptic curve digital signature algorithm (ECDSA)) for the BNI corresponding to three subframes of frames 1 to 12 of the D1 message may be divided into halves and transmitted to a subframe 5 of the frame 11 and a subframe 5 of the frame 12. Likewise, a signature (e.g., the signature generated by using the ECDSA) for the BNI corresponding to three subframe of frames 13 to 24 may be divided into halves and transmitted to the frames 23 and 24. Because a space to which a signature value is transmitted is small in the authentication method of the D1 message, a signature with lengthy authentication information may not be transmitted.

Figure 9:
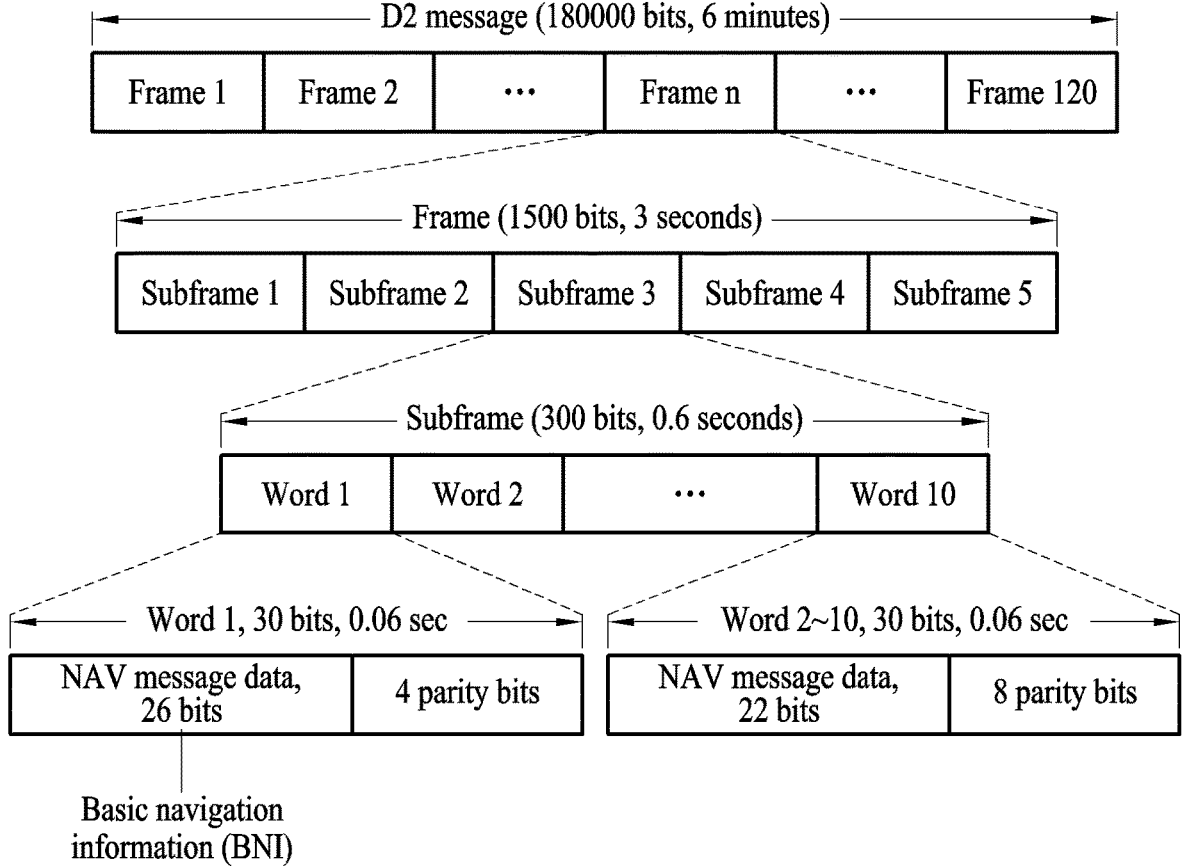
FIG. 9 illustrates a BeiDou D2 message format.

FIG. 9 illustrates a BeiDou D2 message (hereinafter, the D2 message) format.

Referring to FIG. 9, the D2 message may include 120 frames. One frame may include five subframes and be transmitted at 500 bps. BNI may be included by 10 pages (e.g., word) and be divided into 10 subframes 1 and transmitted over 30 seconds. The 10 subframes 1 are referred to as one group, and the one group may be a unit of authentication. The above method may include an authentication method of a signal level.

Figure 10:
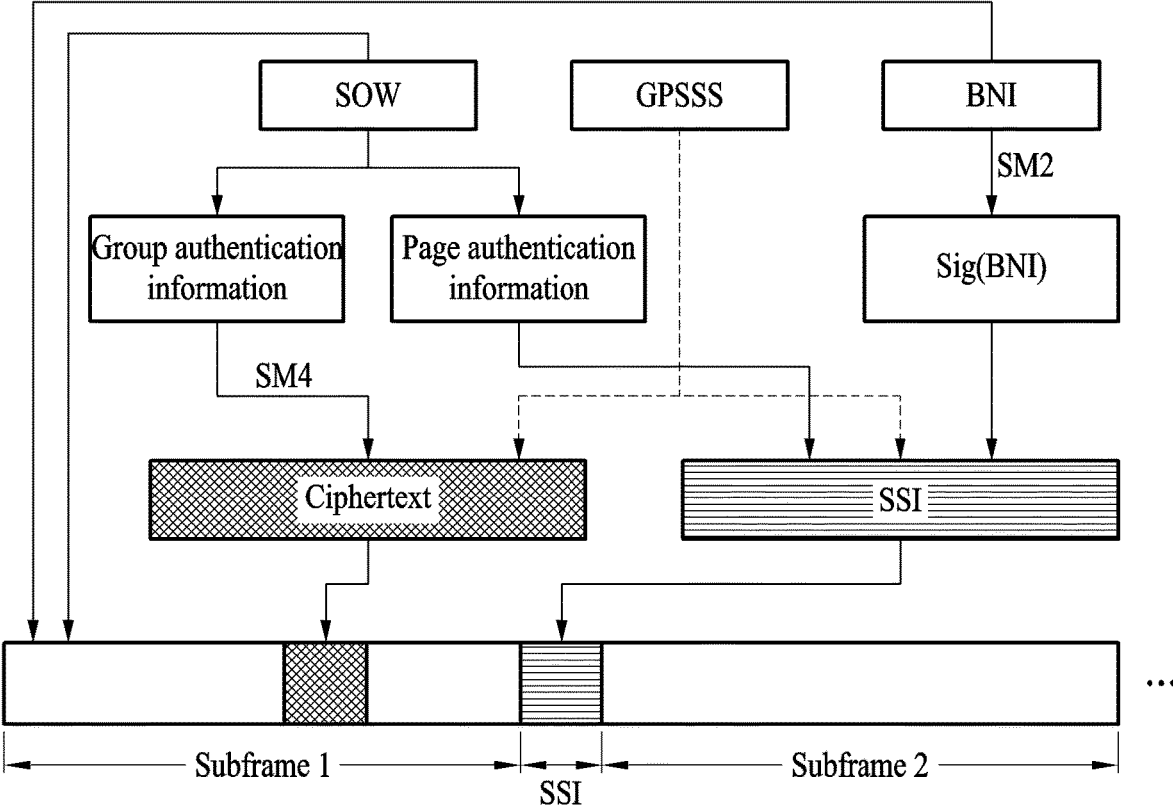
FIG. 10 illustrates a BeiDou D2 message authentication method.

FIG. 10 illustrates a BeiDou D2 message authentication method.

Referring to FIG. 10, group authentication information and page authentication information may be generated from second-of-week (SOW) information included by one group. Then, the generated group authentication information may be encrypted through an SM4 symmetric key encryption algorithm using a 128-bit key and a generator polynomial of a spectrum spreading sequence (GPSSS) for spreading spectrum modulation. A 128-bit ciphertext may be divided and inserted into an extra space in one group (10 subframes 1). In addition, a digital signature (e.g., Sig (BNI)) generated through an SM2 algorithm for BNI may be generated, and the generated Sig (BNI) may be modulated through a GPSSS method together with the page authentication information and become a 75-bit serial synchronous interface (SSI). Then, the SSI may be included between a subframe 1 and a subframe 2 and transmitted.

Figure 11:
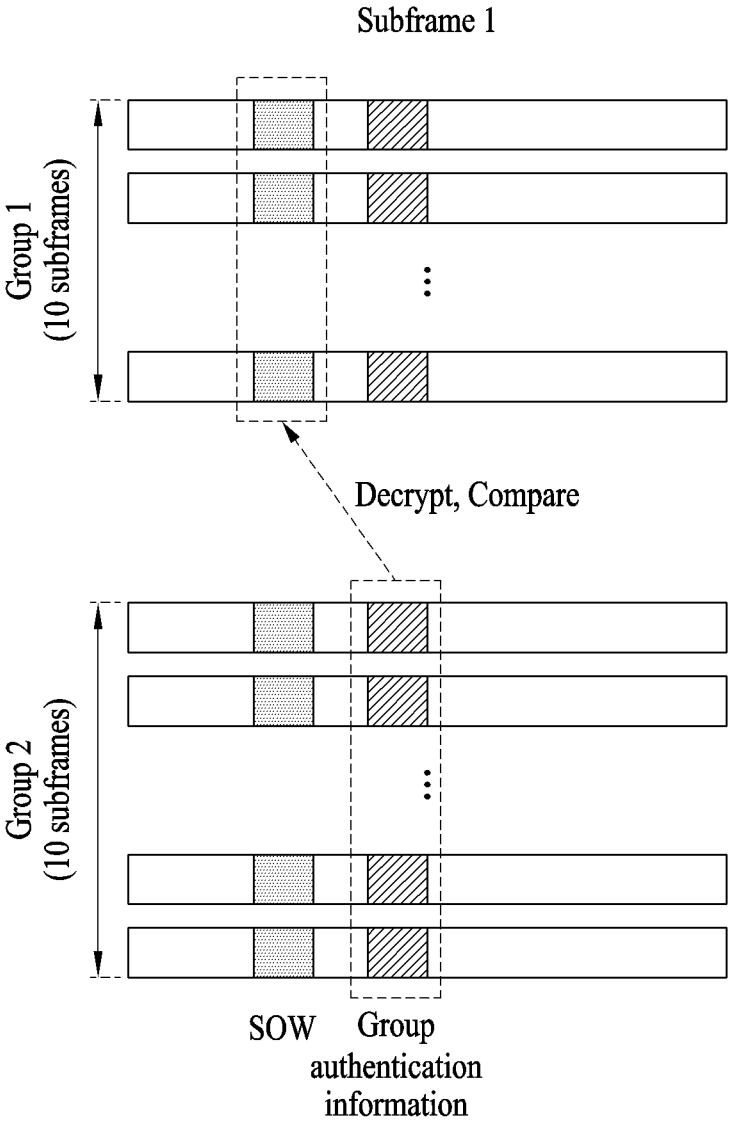
FIG. 11 illustrates a group time information authentication procedure of a receiver of a BeiDou D2 message.
Figure 12:
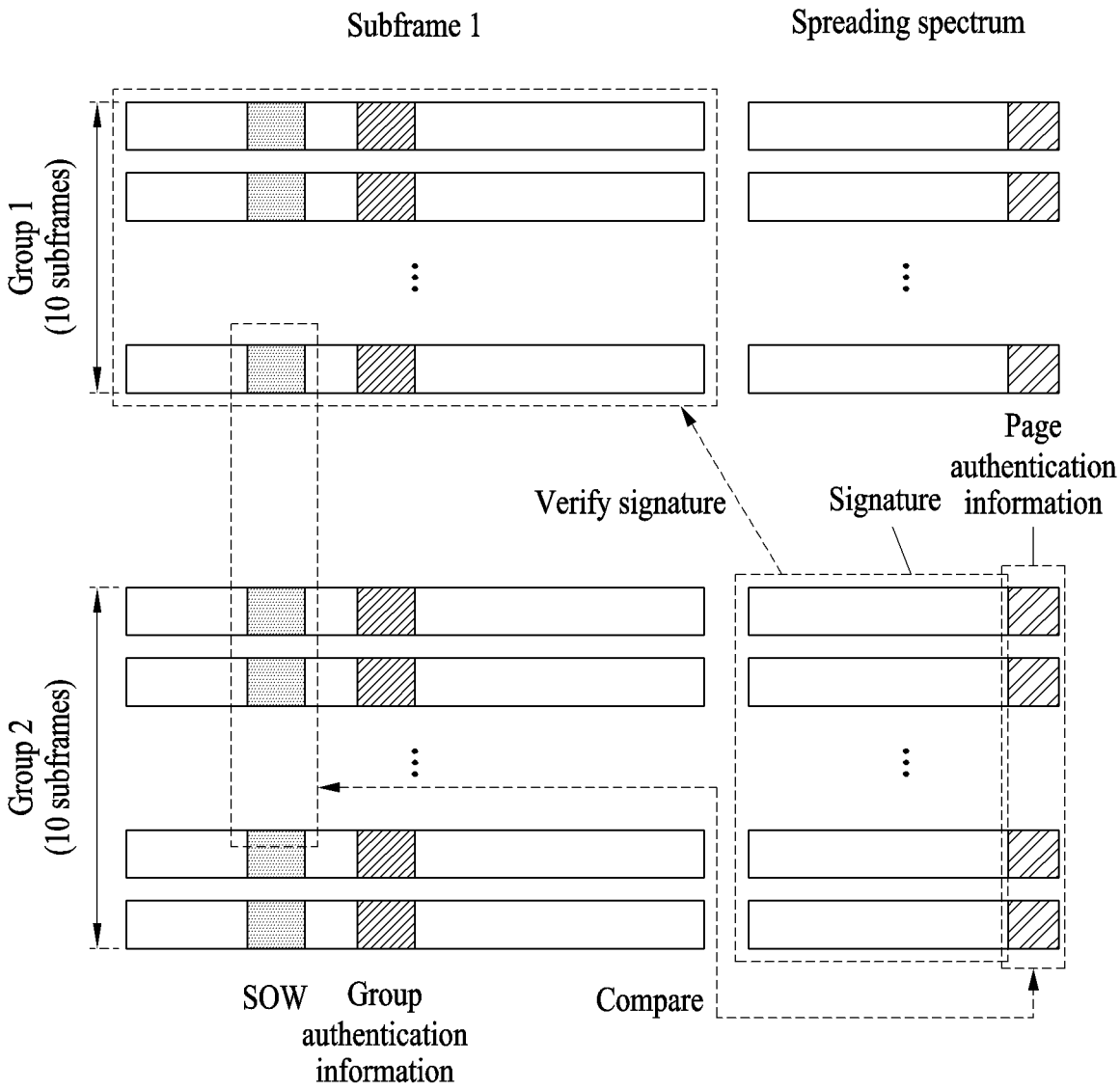
FIG. 12 illustrates a page authentication procedure of a receiver of a BeiDou D2 message.

FIGS. 11 and 12 are diagrams illustrating a detailed authentication procedure of a receiver in the BeiDou D2 method authentication method described above. FIG. 11 illustrates a group time information authentication procedure of a receiver of a BeiDou D2 message, and FIG. 12 illustrates a page authentication procedure of a receiver of a BeiDou D2 message.

Referring to FIG. 11, a receiver (e.g., a receiving device) may generate group authentication information from the SOW information of a previous group (e.g., a group 1). Then, the receiver may extract group authentication information by decrypting a ciphertext received from a next group (e.g., a group 2) and authenticate group time information by comparing whether the extracted group authentication information is the same as the group authentication information of the SOW information generated from the previous group.

Referring to FIG. 12, the receiver may extract a signature and page authentication information by modulating an SSI by using the GPSSS information extracted from the ciphertext. Then, the receiver may verify the extracted page authentication information by comparing the extracted page authentication information with page authentication information generated from the SOW information of a previous group (e.g., the group 1). Finally, the receiver may verify the extracted signature by extracting an SM2 signature for BNI included by the previous group from the received SSI.

Although the BeiDou D2 message authentication method uses a significantly fast channel of 500 bps, one minute or more time may be required to authenticate initial BNI. A D2 message authentication method may go through a duplex and complex authentication procedure by requiring SOW that is not a secret value to be encrypted and transmitted and be used for authentication while verifying integrity from a signature of BNI modulated by using a GPSSS. A secret key method used in the D2 message authentication method may have the challenging task of mutually sharing a key, which may be solved by allowing all receivers (e.g., receiving devices) to retain a master key and updating the key through a secure message system (SMS). Such a master key may not be disclosed to the public and may be protected through an encryption algorithm that is exclusively retained by a receiving device manufacturer, but issues may be raised. For example, such a method of protecting the master key does not follow a general method of verifying safety by disclosing an encryption algorithm and of allowing a minimum number of keys to be maintained in secret. In addition, an attacker owning the receiving device may figure out the secret key by using the master key. Also, all the manufacturers keeping the encryption algorithm a secret may be unrealistic.

Figures 13, 14:
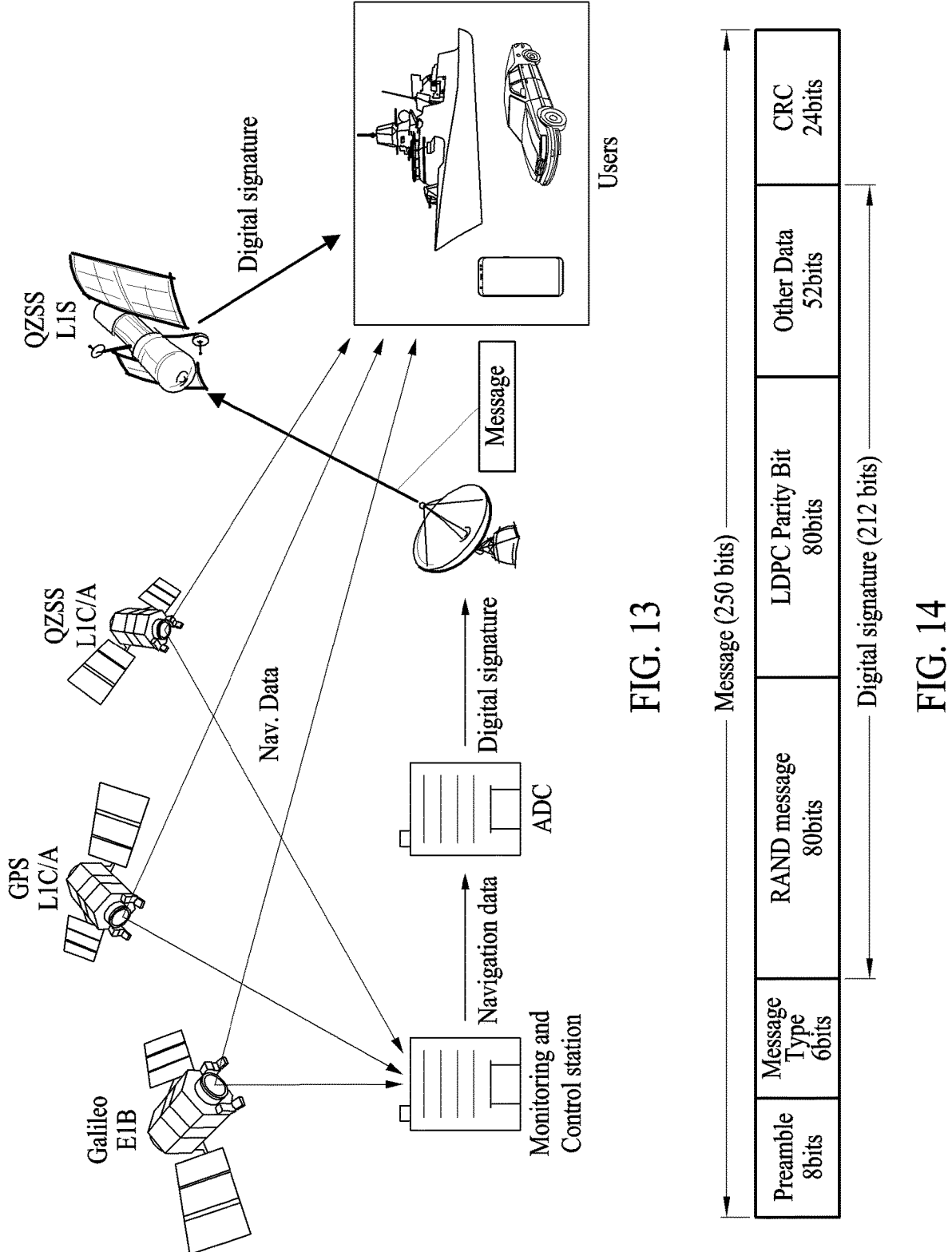
FIG. 13 illustrates a structure of an authentication method of a quasi-zenith satellite system (QZSS).
FIG. 14 illustrates a QZSS message format.
Figure 15:
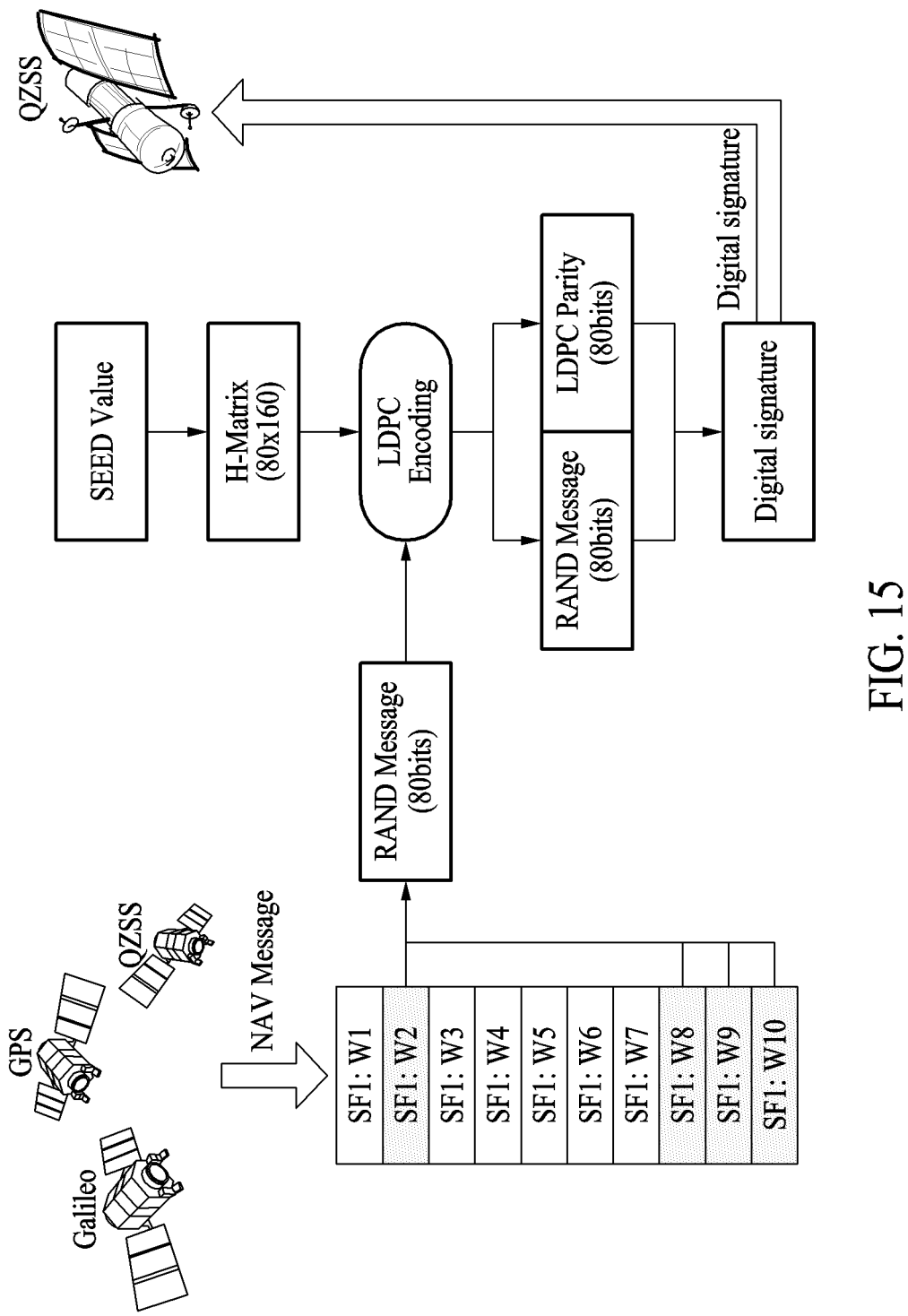
FIG. 15 illustrates a procedure of generating QZSS signature data.

FIGS. 13 to 15 are diagrams illustrating an authentication method based on Japan's satellite navigation system (e.g., a quasi-zenith satellite system (QZSS)).

FIG. 13 illustrates a structure of an authentication method of the QZSS, FIG. 14 illustrates a QZSS message format, and FIG. 15 illustrates a procedure of generating QZSS signature data.

Referring to FIGS. 13 to 15, proposed is a method of authenticating navigation data from all receivable satellites other than QZSS satellites in the QZSS of Japan. As illustrated in FIG. 13, a monitoring and control station may receive and extract navigation data from all receivable satellite signals (e.g., QZSS LIC/A, GPS LIC/A, or Galileo E1B). Then, an authentication data center (ADC) may generate a digital signature for the navigation data extracted by the monitoring and control station. The generated digital signature may instead enter navigation data space (e.g., a random access to NLETS data (RAND) message, a low-density parity check code (LDPC) parity bit, or other data) in the QZSS message format. When the signal generated as such may be uploaded to a satellite by being included by a message format, the QZSS satellite may broadcast the generated signal to users through an LIS signal. An LIS receiver (e.g., a receiving device) may identify a satellite that is an authentication target from a pseudo random number (PRN) identification (ID) and verify a digital signature for received navigation data.

The QZSS authentication method may use a method of generating authentication information on the ground not from the satellite, uploading the generated authentication information to the satellite, and broadcasting it again. In addition, as illustrated in FIG. 15, the 'digital signature' in the QZSS authentication method may refer to an authentication value as an LDPC encoding result not a cryptographic electronic signature using a public key code, and thus, may not secure cryptographic safety.

In examples described with reference to FIGS. 1 to 15, the safest authentication method now may be cryptographic technology. An authentication method using cryptographic technology may be divided into a method of using a secret key code and a method of using a public key code. The secret key code method may be complex while the length of authentication information (e.g., message authentication code (MAC)) therein is relatively short, and the public key code method may be simple while the length of authentication information (e.g., a digital signature) therein is long.

In an authentication method of a satellite navigation message, a navigation message may generally use a channel of which the transmission speed is low. Authentication information providing cryptographic safety may occupy a large space (e.g., a bit length) compared to a message, and thus, authentication may only be performed on a navigation message of which the transmission speed is relatively high. Galileo of Europe uses the secret key code method of which the length of authentication information is relatively short due to lack of space and may transmit the authentication information by dividing it into subframes.

In addition, a status of a high-precision satellite navigation service supporting a precision correction message is as Table 1 below, and an authentication service for a navigation message in the high-precision satellite navigation service is yet to be supported.

TABLE 1

| System | Service | Satellite | Signal | Data Transmission Speed | Standard |
|---|---|---|---|---|---|
| QZSS CLAS | PPP-RTK | IGSO/GEO | 1.278 GHz (L6D) | 2,000 bps | Compact SSR |
| Galileo Has | PPP | MEO | 1.278 GHz (E6b) | 500 bps | Compact SSR |
| GLONAS | PPP | MEO/IGSO | 1.207 GHz (L3) | — | — |

TABLE 1-continued

| System | Service | Satellite | Signal | Data Transmission Speed | Standard |
|--------|---------|-----------|--------|-------------------------|----------|
| BeiDou | PPP | GEO | 1.207 GHz (B2b I/Q) | 500 bps | — |

Hereinafter, a satellite navigation system-based authentication method and an apparatus for performing the same are described with reference to FIGS. 16 to 25.

According to an embodiment, the apparatus (e.g., an apparatus 2500 of FIG. 25) may perform the satellite navigation system-based authentication method. The apparatus 2500 may perform authentication on two messages of different channels by using a second message (a precision correction message) transmitted at a high speed without including authentication information in a first message (e.g., a satellite navigation message and a navigation (NAV) message) transmitted at a low speed. The apparatus 2500 may perform a satellite navigation system-based method to be described below with reference to FIGS. 16 to 24. The apparatus 2500 may be implemented in a transmitter (e.g., a transmitting device) for performing communication through a satellite, in a receiver (e.g., a receiving device), and/or in the satellite.

For example, the NAV message may be based on a satellite navigation message format based on a Korean positioning system (KPS). A centimeter-level service (CLS) message may be based on a centimeter-level augmentation service (CLAS) message format.

Figure 16:
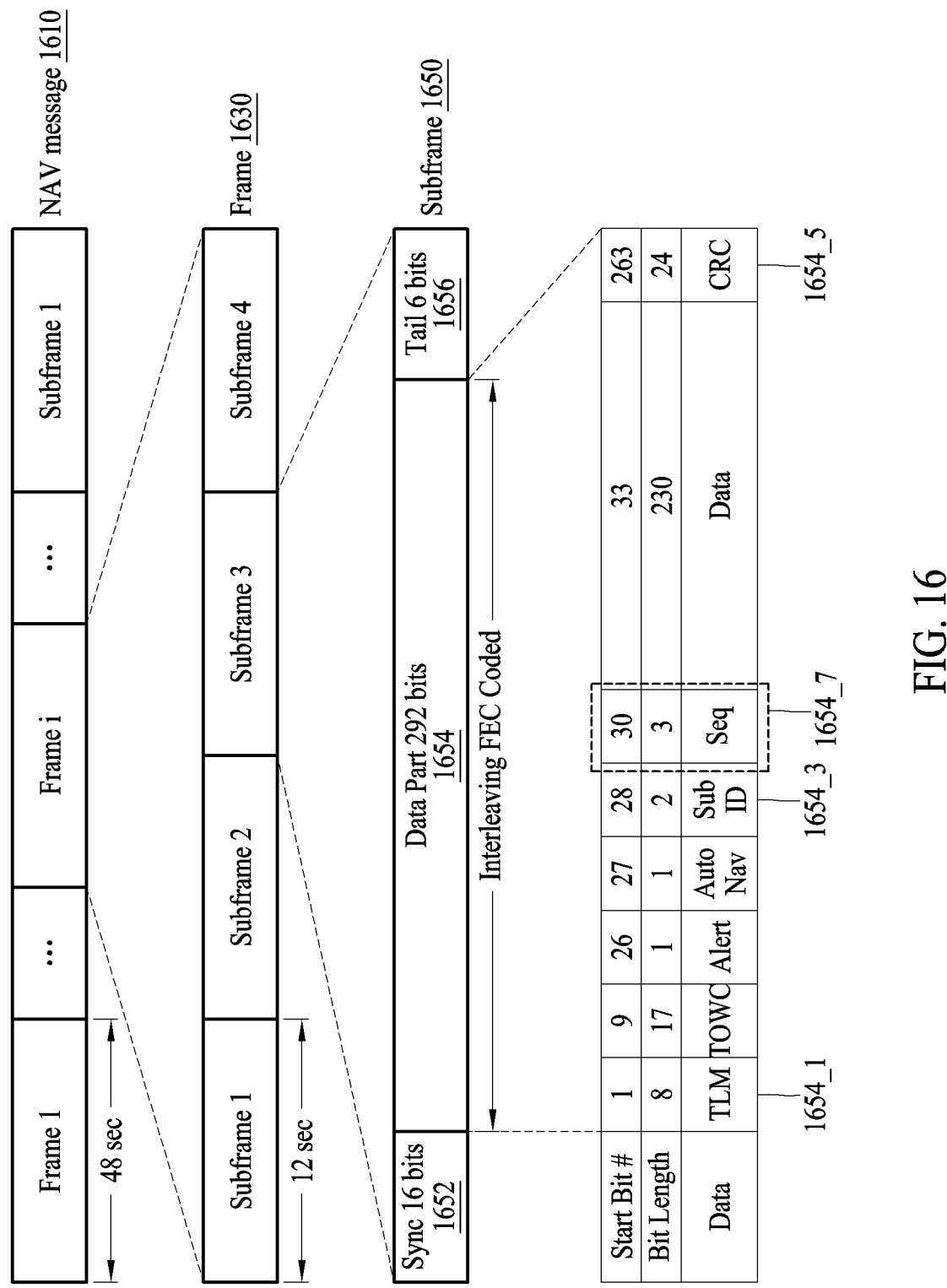
FIG. 16 illustrates an example of a structure of a first message that is an authentication target according to an embodiment.

FIG. 16 illustrates an example of a structure of a first message that is an authentication target according to an embodiment.

Referring to FIG. 16, the first message may comprises an NAV message that is an authentication target of a high-precision satellite navigation service (e.g., the KPS). An NAV message 1610 may be transmitted at a speed of 25 bps with an S band of 2-4 GHZ. The NAV message 1610 may include a plurality of frames 1630 (e.g., N frames, in which N is a natural number greater than 1). Each of the frames 1630 may include a plurality of subframes 1650 (e.g., 4 subframes). Each of the subframes 1650 may be transmitted over several seconds (e.g., 12 seconds). Each of the subframes 1650 may include a sync part 1652 of M bits (e.g., 16 bits, in which M is a natural number greater than 1) for synchronization, a data part 1654 of 282 bits for an NAV message, and a tail part 1656 of 6 bits. The data part 1654 of each of the subframes 1650 may commonly include a tracker log message (TLM) field 1654_1, a Sub ID field 1654_3, and a cyclic redundancy check (CRC) field. The rest of 233 bits other than the commonly included fields may include a different item (e.g., a time of week counter (TOWC) field, an alert field, and/or an auto NAV field) for each of the subframes 1650. According to an embodiment, the NAV message 1610 (e.g., the data part 1654 included by each of the subframes 1650 of the NAV message 1610) may further include a field (e.g., a Seq field 1654_7) for synchronization with the CLS message (e.g., a subframe 1730 of a CLS message of FIG. 17). The Seq field 1654_7 may be a field, which occupies N bits (e.g., 3 bits, in which N is a natural number greater than 1) of spare bits included by 233 bits, for authentication.

Figure 17:
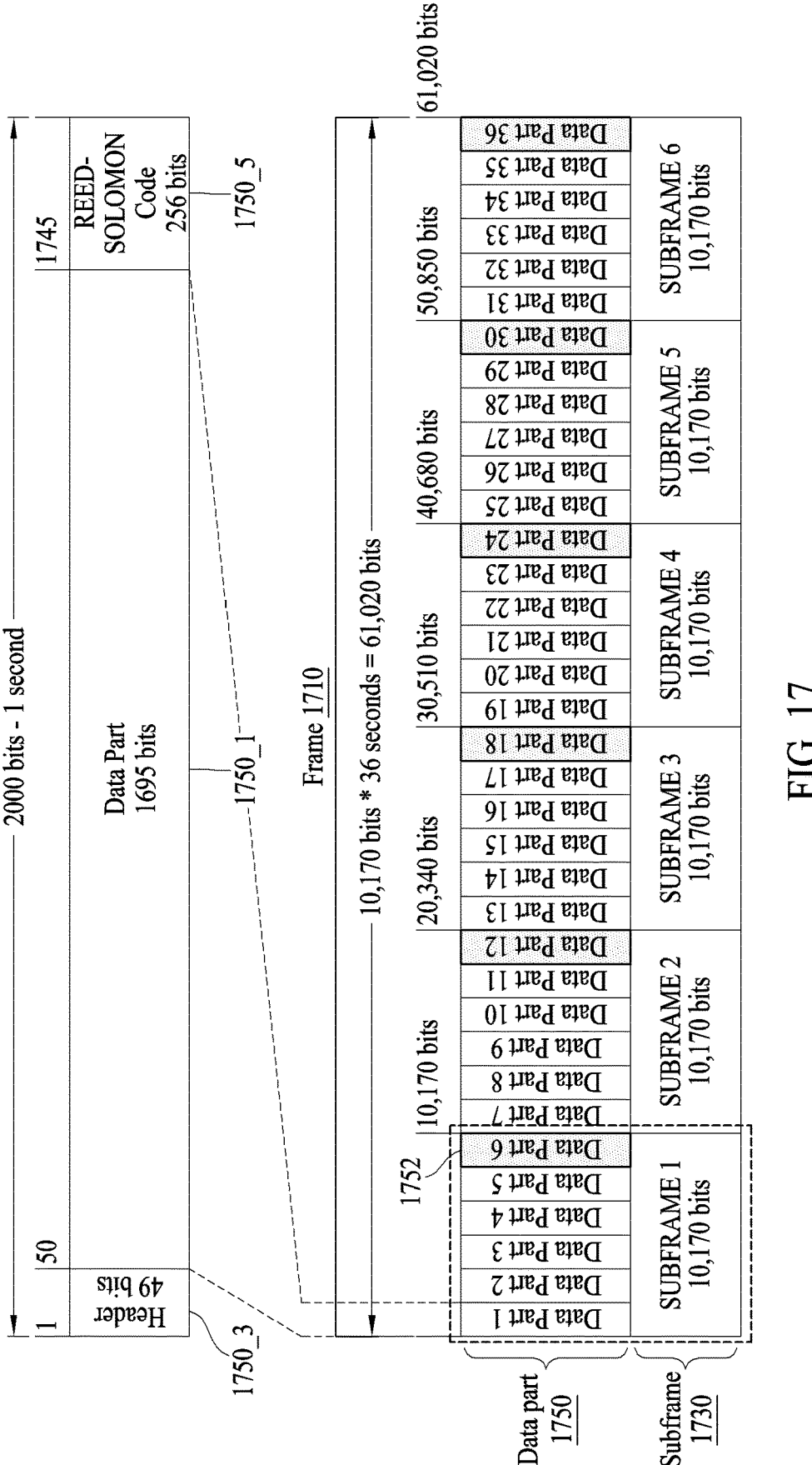
FIG. 17 illustrates an example of a structure of a second message that is the authentication target according to an embodiment.

FIG. 17 illustrates an example of a structure of a second message that is the authentication target according to an embodiment.

Referring to FIG. 17, the second message may comprises a precision correction message (e.g., the CLS message) that is an authentication target of a high-precision satellite navigation service (e.g., the KPS). The second message (e.g., The CLS message) may be a message which is transmitted via channel which is differ from channel where the first message is transmitted. The CLS message may be based on a precision correction message (e.g., a CLAS) of a QZSS.

The CLS message may include a plurality of frames 1710 (e.g., N frames, in which N is a natural number greater than 1). Each of the frames 1710 may include a plurality of subframes 1730 (e.g., 6 subframes). Each of the subframes 1730 may include N data parts 1750 (e.g., 5 data parts 1750, in which N is a natural number greater than 1). Each of the subframes 1730 of the CLS message may further include one data part N+1 (e.g., 6) 1752 (hereinafter, a data part 1752 for authentication) for authentication information, and one subframe 1730 may be transmitted over several seconds (e.g., 6 seconds).

Each of the data parts 1750 (e.g., a data part 1 and a data part 2) may be 2000 bits and may include a satellite identifier (e.g., a PRN), a header 1750_3 of 49 bits including a message identifier ID and Reed-Solomon code 1750_5 of 256 bits for error correction in a data part 1750_1 of 1695 bits. The types of data transmitted to each data part 1750_1 may be classified by a data type field, and the number of data types may be M (e.g., 12 types, in which M is a natural number greater than 1). A data type (hereinafter, a data type for authentication) for authentication information may be defined and included by the data part 1752 for authentication.

The structure of the data type for authentication may be as Table 2 below.

TABLE 2

| Field | Bit Length | Value/Meaning | Authentication Target | | |
|-------|-----------|---------------|------|-----|-------------|
| | | | NAV | CLS | NAV+ CLS |
| Auth Target | 2 | 1: NAV, 2: CLS, 3: NAV + CLS | V | V | V |
| GNSS ID | 4 | 6 (KPS) | V | | V |
| PRN | 8 | KPS PRN | V | | V |
| NAV Header | 32 | KPS NAV Header | V | | V |
| Hash ID | 4 | 16 KISA recommended algorithms | V | V | V |
| Signature Algorithm ID | 1 | 0: ECDSA 1: EC-KCDSA | V | V | V |
| Key Length | 2 | 0:224, 1:256, 2:384, 3:512 | V | V | V |
| Public Key ID | 5 | 32 public keys | V | V | V |
| NAV Signature | 448, 512, 668, 1024 | NAV message digital signature | V | | V |
| CLS Signature | 448, 512, 668, 1024 | CLS message digital signature | | V | V |

The data type for authentication may include first authentication information (e.g., authentication information on an NAV message) and/or second authentication information (e.g., authentication information on a CLS message) as an authentication target. The authentication information may comprises authentication information for performing authentication on a message (e.g., a first message, a second message). For example, the authentication information comprises first authentication information for performing authentication on the first message (e.g., an NAV message)

and second authentication information for performing authentication on the second message (e.g., a CLS message). The authentication information may comprises a digital signature for the NAV message and/or the CLS message transmitted right before.

The data type for authentication may include a field for satellite information (e.g., a global navigation satellite system (GNSS) ID and a PRN of Table 3). The data type for authentication may include respective fields of a hash function identifier (a hash ID) used for a digital signature, a digital signature algorithm identifier (a signature algorithm ID), the length (a key length) of a key used for the digital signature, and the digital signature (an NAV signature and a CLS signature). When the authentication information on the NAV message becomes an authentication target, for example, when a value of an authentication target field is 1 or 3, the data type for authentication may also include a header field of the NAV message. A value of an identifier of each field of the data type for authentication of Table 2 may be pre-defined and shared by a satellite and a receiver. A hash function, a digital signature algorithm, and a key length that are used may follow the recommendations of the Korea Internet Security Agency (KISA), which may be available after 2030, and may be selectively used. The length of a digital signature (e.g., the NAV signature and the CLS signature of Table 2) may vary depending on the length of a key to be used, and the length may be as Table 3 below.

Figure 19:
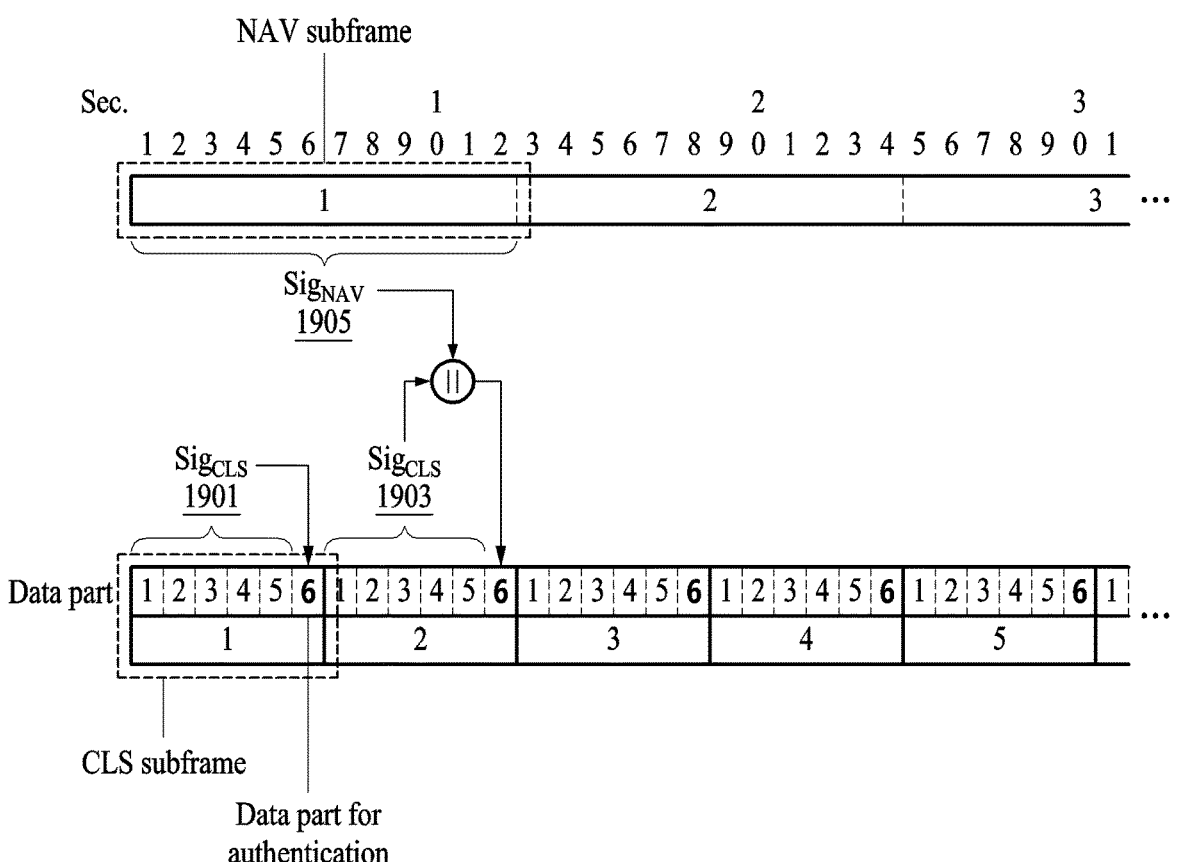
FIG. 19 illustrates an authentication method 1 according to an embodiment.

Referring to FIG. 19, an apparatus (e.g., the apparatus 2500 of FIG. 25) may perform the authentication method 1.

The apparatus 2500 may generate authentication information 1901 (e.g., a digital signature) on data parts (e.g., data parts 1 to 5) of an odd-numbered CLS subframe (e.g., a CLS subframe 1). The apparatus 2500 may include the authentication information 1901 in a data part (e.g., a data part 6) for authentication of the odd-numbered CLS subframe.

The apparatus 2500 may generate authentication information 1903 (e.g., the digital signature) on data parts (e.g., the data parts 1 to 5) of an even-numbered CLS subframe (e.g., a CLS subframe 2). The apparatus 2500 may generate authentication information 1905 (e.g., the digital signature) of an NAV subframe (e.g., an NAV subframe 1) synchronized with the even-numbered CLS subframe. The apparatus 2500 may concatenate the generated pieces of authentication information 1903 and 1905 and include a concatenation of the authentication information 1903 and 1905 in the data part (e.g., the data part 6) for authentication of the even-numbered CLS subframe.

The apparatus 2500 may transmit a CLS message including pieces of authentication information (e.g., the authentication information 1901 and the concatenation of the authentication information 1903 and 1905).

When the apparatus 2500 performs authentication by using the authentication method 1, authentication may be

TABLE 3

| Field | Authentication Target (Bit Length) | | | | | | | | | | | |
| | NAV | | | | CLS | | | | NAV + CLS | | | |
|---|---|---|---|---|---|---|---|---|---|---|---|---|
| Authentication Target | 2 | | | | 2 | | | | 2 | | | |
| GNSS ID | 4 | | | | | | | | 4 | | | |
| PRN | 8 | | | | | | | | 8 | | | |
| NAV Header | 32 | | | | | | | | 32 | | | |
| Hash ID | 4 | | | | 4 | | | | 4 | | | |
| Signature Algorithm ID | 1 | | | | 1 | | | | 1 | | | |
| Key Length | 2 | | | | 2 | | | | 2 | | | |
| Public Key ID | 5 | | | | 5 | | | | 5 | | | |
| NAV Signature | 448 | 512 | 768 | 1024 | | | | | 448 | 512 | 768 | 1024 |
| CLS Signature | | | | | 448 | 512 | 768 | 1024 | 448 | 512 | 768 | 1024 |
| Total | 506 | 570 | 826 | 1082 | 462 | 526 | 782 | 1038 | 954 | 1082 | 1594 | 2106 |

Figure 18:
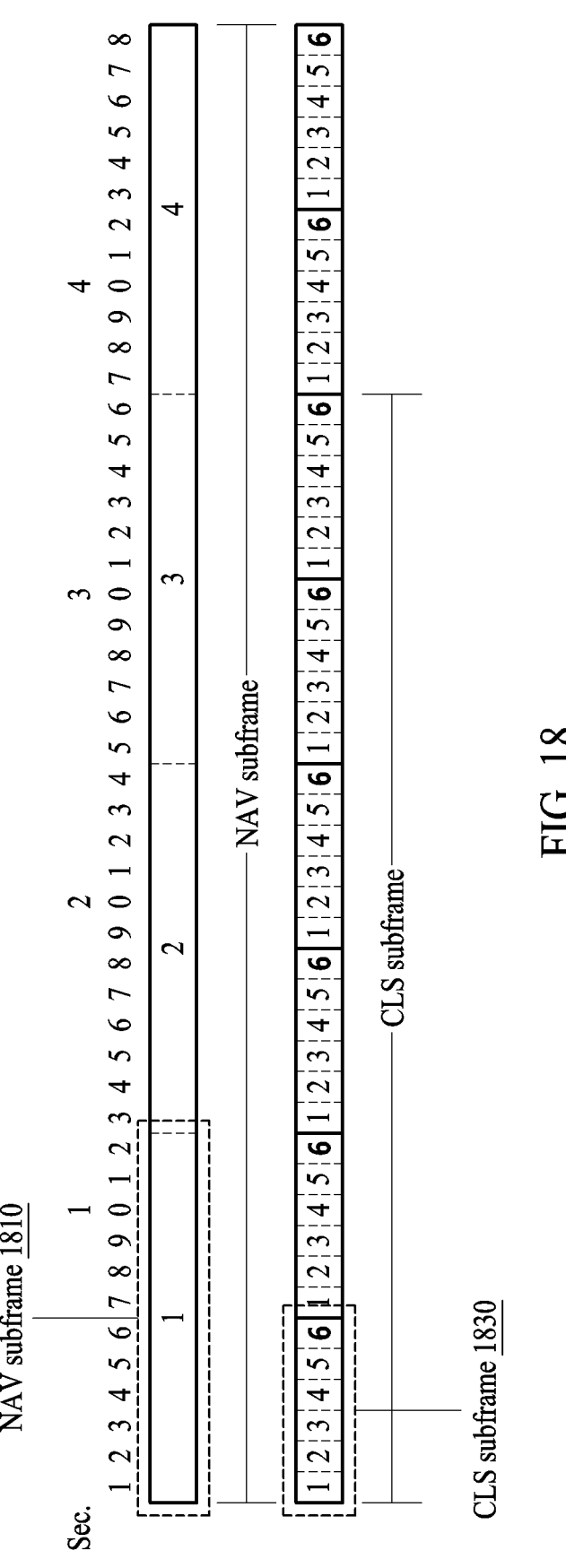
FIG. 18 illustrates subframe synchronization of a first message and a second message according to an embodiment.

FIG. 18 illustrates subframe synchronization of a first message and a second message according to an embodiment.

Referring to FIG. 18, the first message may be a navigation message (e.g., an NAV message) that is an authentication target of a high-precision satellite navigation service (e.g., the KPS), and the second message may be a precision correction message (e.g., a CLS message) that is an authentication target of the high-precision satellite navigation service (e.g., the KPS).

As illustrated in FIGS. 16 and 17, by adding the Seq field 1654_7 to the NAV message and adding the data part 1752 for authentication information to the CLS message, a transmission time of an NAV subframe 1810 and a CLS subframe 1830 may be synchronized. As illustrated in FIG. 18, while the M (e.g., 1) NAV subframes 1810 are transmitted, N (e.g., 2) CLS subframes 1830 may be transmitted.

The generation and transmission of a digital signature may be performed selectively in one of the authentication methods to be described below.

FIG. 19 illustrates an authentication method 1 according to an embodiment.

rapidly performed by units of one subframe. In this case, the length of authentication information may increase by concatenating the pieces of the authentication information 1903 and 1905. Accordingly, authentication information generated through a 1024-bit key may not be included by even-numbered CLS subframes due to a limited space.

Figure 20:
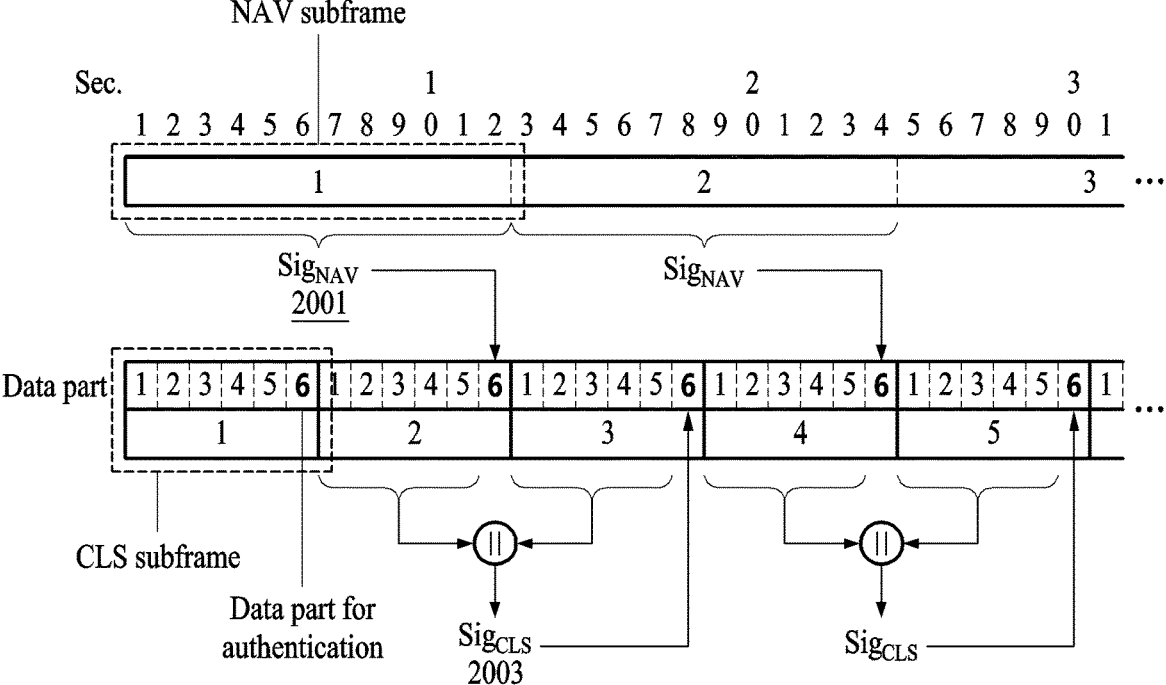
FIG. 20 illustrates an authentication method 2 according to an embodiment.

FIG. 20 illustrates an authentication method 2 according to an embodiment.

Referring to FIG. 20, an apparatus (e.g., the apparatus 2500 of FIG. 25) may perform the authentication method 2.

The apparatus 2500 may generate authentication information 2001 (e.g., a digital signature) of an NAV subframe (e.g., an NAV subframe 1) synchronized with an even-numbered CLS subframe (e.g., a CLS subframe 2). The apparatus 2500 may include the authentication information 2001 in a data part (e.g., a data part 6) for authentication of the even-numbered CLS subframe.

The apparatus 2500 may generate authentication information 2003 (e.g., the digital signature) by concatenating data parts (e.g., data parts 1 to 5) of an odd-numbered CLS subframe (e.g., a CLS subframe 3) and the data parts (e.g., the data parts 1 to 5) of a previous CLS subframe (e.g., a CLS subframe 2). The apparatus 2500 may include the authentication information 2003 in the data part (e.g., the data part 6) for authentication of the odd-numbered CLS subframe.

The apparatus 2500 may generate authentication information on the data parts (e.g., the data parts 1 to 5) of a CLS subframe (e.g., a CLS subframe 1) and include the generated authentication information in the data part (e.g., the data part 6) for authentication of the CLS subframe (e.g., the CLS subframe 1).

The apparatus 2500 may transmit a CLS message including pieces of authentication information (e.g., the authentication information 2001 and 2003).

When the apparatus 2500 performs authentication by using the authentication method 2, authentication information generated through a 1024-bit key may be included by a data part for authentication of a CLS subframe, but authentication time may increase compared to the authentication method 1.

Figure 21:
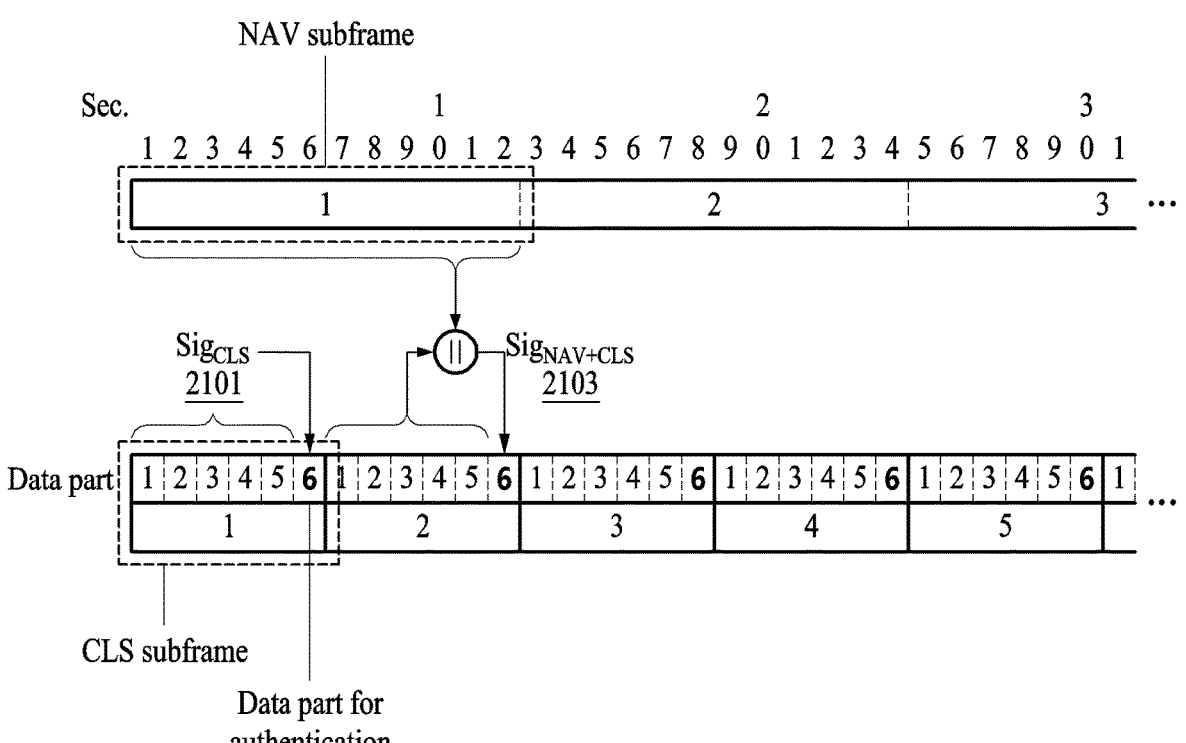
FIG. 21 illustrates an example of a concatenation of an authentication method 3 according to an embodiment.
Figure 22:
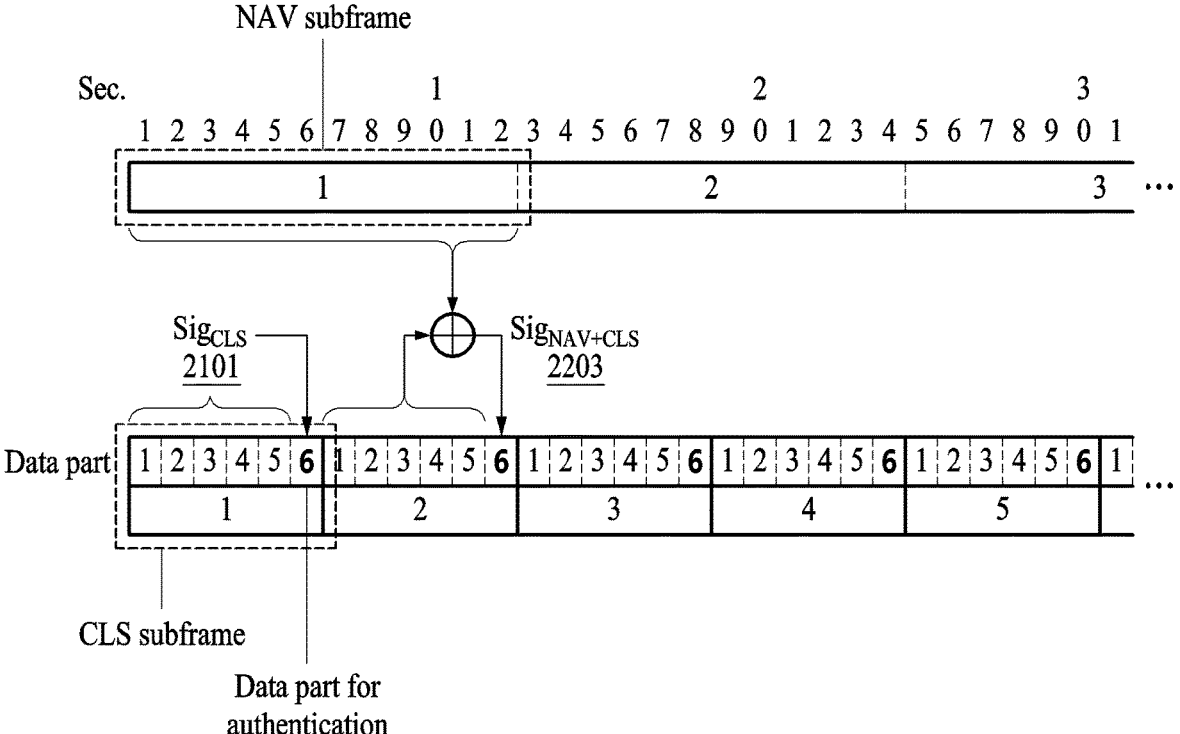
FIG. 22 illustrates an example of an exclusive-or operation of the authentication method 3 according to an embodiment.

FIGS. 21 and 22 are diagrams illustrating an authentication method 3 according to an embodiment.

FIG. 21 illustrates an example of a concatenation of the authentication method 3, and FIG. 22 illustrates an example of an exclusive-or operation of the authentication method 3.

Referring to FIGS. 21 and 22, an apparatus (e.g., the apparatus 2500 of FIG. 25) may perform the authentication method 3.

The apparatus 2500 may generate authentication information 2101 (e.g., a digital signature) on data parts (e.g., data parts 1 to 5) of an odd-numbered CLS subframe (e.g., a CLS subframe 1). The apparatus 2500 may include the authentication information 2101 in a data part (e.g., a data part 6) for authentication of the odd-numbered CLS subframe.

The apparatus 2500 may generate authentication information 2103 (e.g., the digital signature) by concatenating the data parts (e.g., the data parts 1 to 5) of an even-numbered CLS subframe (e.g., a CLS subframe 2) and an NAV subframe (e.g., an NAV subframe 1) synchronized with the even-numbered CLS subframe. The apparatus 2500 may include the authentication information 2103 in the data part (e.g., the data part 6) for authentication of the even-numbered CLS subframe (e.g., the CLS subframe 2).

The apparatus 2500 may generate authentication information 2203 (e.g., the digital signature) by performing an exclusive-or on the data parts (e.g., the data parts 1 to 5) of the even-numbered CLS subframe and the NAV subframe (e.g., the NAV subframe 1) synchronized with the even-numbered CLS subframe. The apparatus 2500 may include the authentication information 2203 in the data part (e.g., the data part 6) for authentication of the even-numbered CLS subframe (e.g., the CLS subframe 2).

As illustrated in FIG. 22, when the apparatus 2500 performs an exclusive-or on messages and generates the authentication information 2203, the length of a message may be adjusted by padding a bit string (e.g., 1000 . . . ) to a short message.

The apparatus 2500 may transmit a CLS message including pieces of authentication information (e.g., the authentication information 2101 and the authentication information 2103 or 2203). For example, the apparatus 2500 may transmit the CLS message including the authentication information 2101 and 2103 or the CLS message including the authentication information 2101 and 2203.

When the apparatus 2500 performs authentication by using the authentication method 3, the length of authentication information may not increase because the authentication information 2103 and 2203 is generated by performing a concatenation or an exclusive-or on messages, and the authentication cycle may not increase. However, when the apparatus 2500 does not use a CLS message, authentication may not be performed only by receiving an NAV message, and the apparatus 2500 may also need to store the CLS message for authentication.

Figure 23:
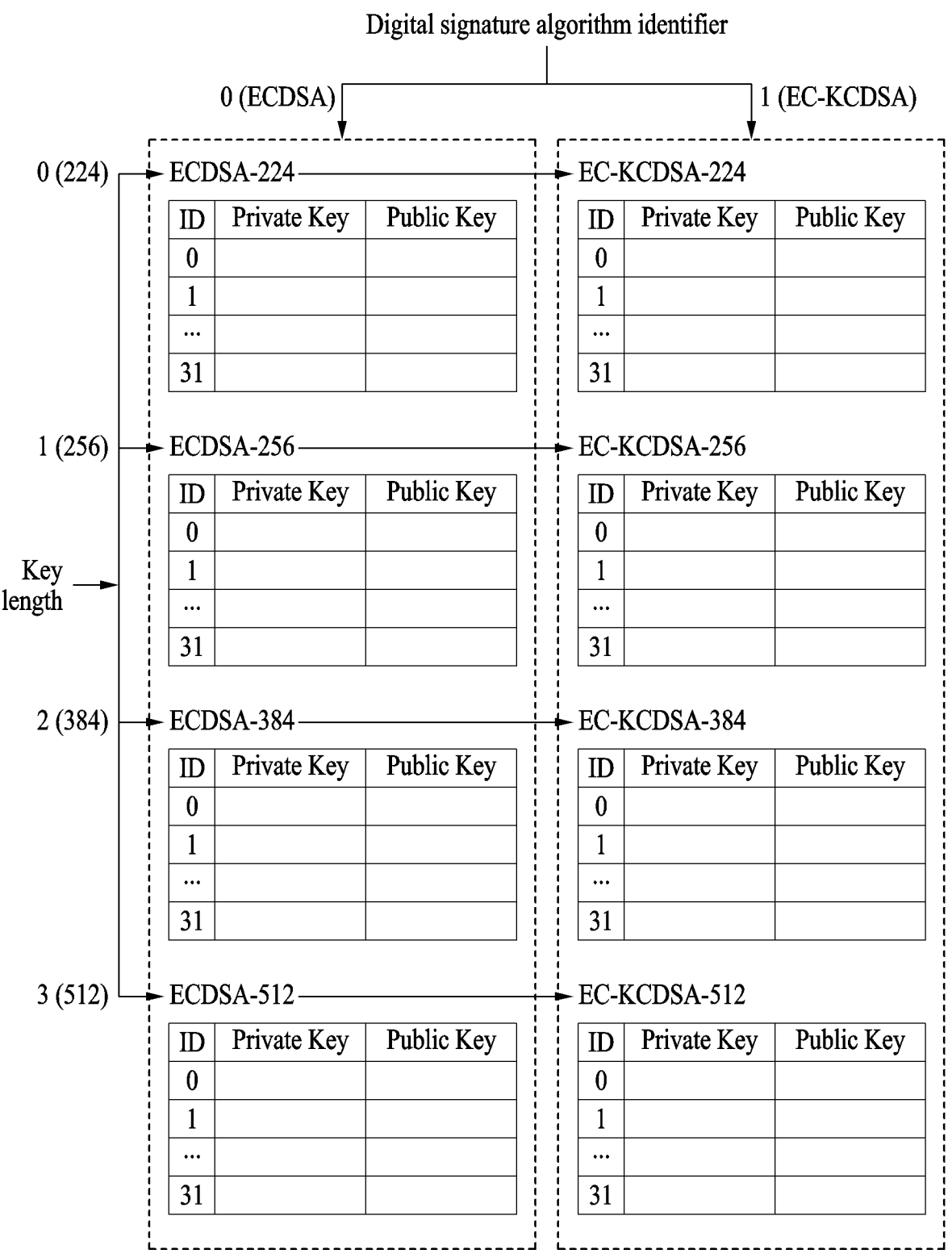
FIG. 23 illustrates a public key table according to an embodiment.

FIG. 23 illustrates a public key table according to an embodiment.

Referring to FIG. 23, a private key used for a digital signature may be confidentially retained by a satellite, and a public key corresponding to the private key may need to be publicly shared with receivers.

Public keys respectively corresponding to public key identifiers (public key IDs) may be stored in a table form. As shown in Table 3, a public key ID is 5 bits, and thus, a table may store a maximum of $2^5$ public keys. When a user (e.g., the apparatus 2500) of an authentication method desires to use different tables according to a digital signature algorithm (e.g., an ECDSA) and an elliptic curve-Korean certificate-based digital signature algorithm (EC-KCDSA)) and a key length, $2^3$ tables including $2^5$ public keys may be used because a digital signature algorithm ID is 1 bit and the key length is 2 bits.

When different encryption techniques are used for NAV authentication and CLS authentication to increase the safety of the authentication method, $2^3*2$ tables may be used because respective public key tables for an NAV message and a CLS message are used.

When a public key used for a message is stored by using different tables for each of N satellites, a maximum of $2^3*2*N$ tables may be used because a maximum of $2^3*2$ tables is used for each of the N satellites. The number of public key tables may be adjusted from IN to $2^3*2*N$ according to a renewal cycle of a public key and the lifespan of a satellite.

When using the authentication method (e.g., the authentication methods 1 to 3), the apparatus 2500 may selectively use a hash function, a digital signature algorithm, and a key length as follows:

(1) the hash function: SHA-224, SHA-256, SHA-384, SHA-512, SHA-512/224, SHA-512/256, SHA3-224, SHA3-256, SHA3-384, SHA3-512, LSH-224, LSH-256, LSH-384, LSH-512, LSH-512-224, and LSH-512-256;

(2) the digital signature algorithm: the ECDSA and the EC-KCDSA; and (3) the key length: 224, 256, 384, and 512.

Figure 24:
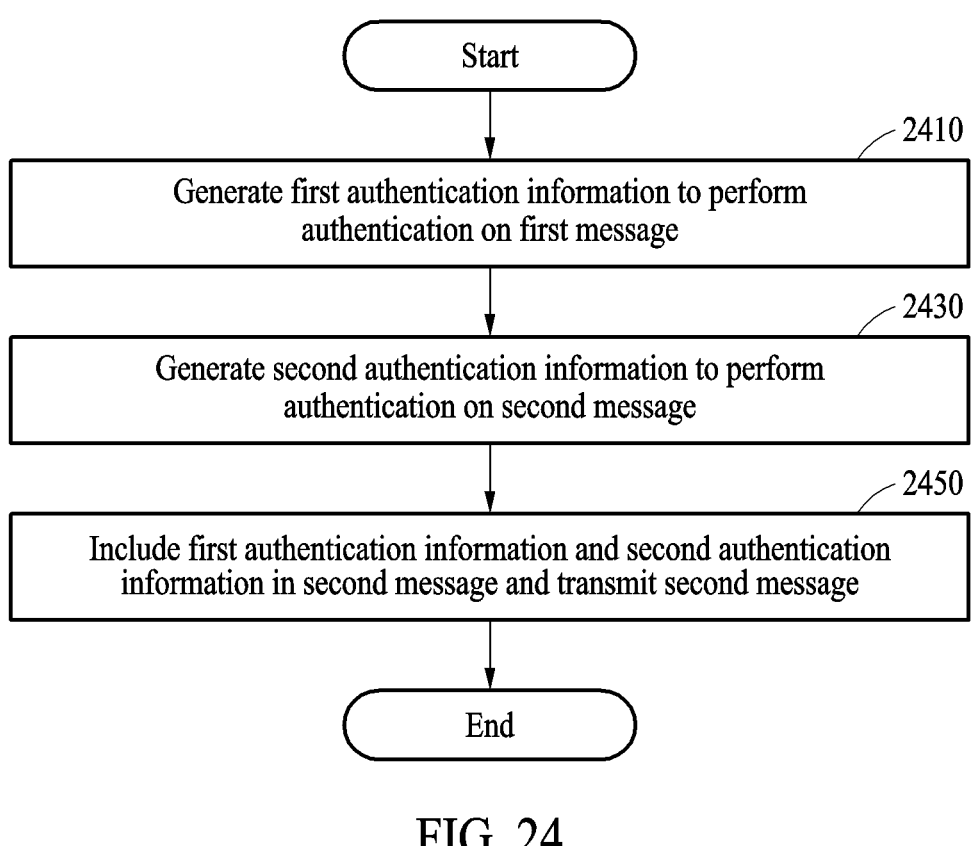
FIG. 24 is a flowchart illustrating a satellite navigation system-based authentication method according to an embodiment.

FIG. 24 is a flowchart illustrating a satellite navigation system-based authentication method according to an embodiment. Operations 2410 to 2450 may be practically the same as the authentication method used by the apparatus (e.g., the apparatus 2500) described with reference to FIGS. 16 to 24.

In operation 2410, the apparatus 2500 may generate first authentication information (e.g., the authentication information 1905 of FIG. 19) to perform authentication on a first message (e.g., a satellite navigation message and an NAV message).

In operation 2430, the apparatus 2500 may generate second authentication information (e.g., the authentication information 1901 of FIG. 19) to perform the second message (e.g., a precision correction message (e.g., a CLS))

In operation 2450, the apparatus 2500 may include and transmit the first and second authentication information.

Operations 2410 to 2450 may be sequentially performed, but examples are not limited thereto. For example, two or more operations may be parallelly performed.

Figure 25:
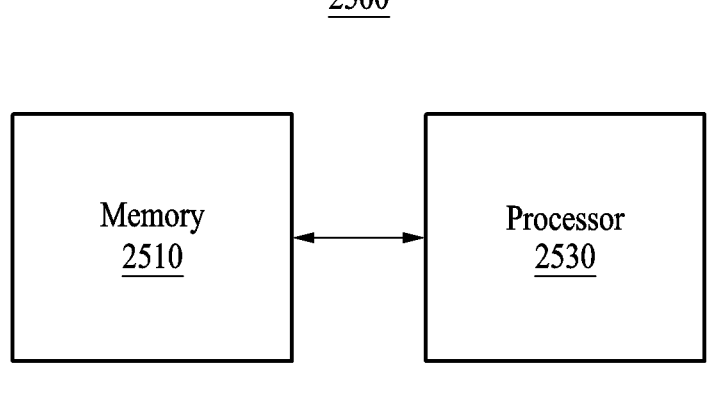
FIG. 25 is a schematic block diagram illustrating an apparatus according to an embodiment.

FIG. 25 is a schematic block diagram illustrating an apparatus according to an embodiment.

Referring to FIG. 25, an apparatus 2500 may be an apparatus for performing a satellite navigation system-based authentication method. The apparatus 2500 may perform a satellite navigation system-based method to be described below with reference to FIGS. 16 to 24. The apparatus 2500 may be implemented in a transmitter (e.g., a transmitting device) for performing communication through a satellite, in a receiver (e.g., a receiving device), and/or in the satellite. The apparatus 2500 may include a memory 2510 and a processor 2530.

The memory 2510 may store instructions (or programs) executable by the processor 2530. For example, the instructions may include instructions for executing an operation of the processor 2530 and/or an operation of each component of the processor 2530.

The memory 2510 may include one or more computer-readable storage media. The memory 2510 may include non-volatile storage elements (e.g., a magnetic hard disk, an optical disc, a floppy disc, a flash memory, an electrically programmable memory (EPROM), and an electrically erasable and programmable memory (EEPROM).

The memory 2510 may be a non-transitory medium. The term "non-transitory" may indicate that a storage medium is not embodied in a carrier wave or a propagated signal. However, the term "non-transitory" should not be interpreted to mean that the memory 2510 is non-movable.

The processor 2530 may process data stored in the memory 2510. The processor 2530 may execute computer-readable code (e.g., software) stored in the memory 2510 and instructions triggered by the processor 2530.

The processor 2530 may be a hardware-implemented data processing device including a circuit that is physically structured to execute desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The operations performed by the processor 2530 may be practically the same as the satellite navigation system-based authentication method described with reference to FIGS. 16 to 24. Accordingly, further description thereof is not repeated herein.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape: optical media such as CD-ROM discs, DVDs, and/or Blue-ray discs: magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A satellite navigation system-based authentication method, the method comprising:
    receiving a first message;
    receiving a second message which includes first authentication information and second authentication information via a channel which is different from a channel where the first message is transmitted;

authenticating the first message by using the first authentication information; and authenticating the second message by using the second authentication information;

wherein the first message comprises a navigation message transmitted at a low speed, and the second message comprises a centimeter-level service message transmitted at a high speed, wherein a subframe of the first message comprises a field for synchronizing the second message with the subframe, and a subframe of the second message comprises a data part comprising the first authentication information and the second authentication information, and wherein an odd-numbered subframe of subframes comprised by the second message comprises authentication information on the odd-numbered subframe, and an even-numbered subframe of the subframes comprised by the second message comprises a concatenation of authentication information on a subframe corresponding to an even-numbered subframe of the subframes comprised by the first message and authentication information on the even-numbered subframe.

2. The method of claim 1, wherein the first authentication information comprises a digital signature for the first message, and the second authentication information comprises a digital signature for the second message.

3. The method of claim 1, wherein an even-numbered subframe of subframes comprised by the second message comprises authentication information on a subframe corresponding to the even-numbered subframe of the subframes comprised by the first message, and an odd-numbered subframe of the subframes comprised by the second message comprises a concatenation of the even-numbered subframe and the odd-numbered subframe.

4. The method of claim 1, wherein an odd-numbered subframe of subframes comprised by the second message comprises authentication information on the odd-numbered subframe, and an even-numbered subframe of the subframes comprised by the second message comprises authentication information on a concatenation or an exclusive-or of the even-numbered subframe and a subframe corresponding to the even-numbered subframe of subframes comprised by the first message.

5. An apparatus configured to perform a satellite navigation system-based authentication method, the apparatus comprising:

a memory comprising instructions; and a processor electrically connected to the memory and configured to execute the instructions, wherein the processor performs a plurality of operations when the instructions are executed by the processor, and the operations comprise:

receiving a first message;

receiving a second message which includes first authentication information and second authentication information via a channel which is different from a channel where the first message is transmitted;

authenticating the first message by using the first authentication information; and authenticating the second message by using the second authentication information;

wherein the first message comprises a navigation message transmitted at a low speed, and the second message comprises a centimeter-level service message transmitted at a high speed, wherein a subframe of the first message comprises a field for synchronizing the second message with the subframe, and a subframe of the second message comprises a data part comprising the first authentication information and the second authentication information, and wherein an odd-numbered subframe of subframes comprised by the second message comprises authentication information on the odd-numbered subframe, and an even-numbered subframe of the subframes comprised by the second message comprises a concatenation of authentication information on a subframe corresponding to an even-numbered subframe of the subframes comprised by the first message and authentication information on the even-numbered subframe.

6. The apparatus of claim 5, wherein the first authentication information comprises a digital signature for the first message, and the second authentication information comprises a digital signature for the second message.

7. The apparatus of claim 5, wherein an even-numbered subframe of subframes comprised by the second message comprises authentication information on a subframe corresponding to the even-numbered subframe of the subframes comprised by the first message, and an odd-numbered subframe of the subframes comprised by the second message comprises a concatenation of the even-numbered subframe and the odd-numbered subframe.

8. The apparatus of claim 5, wherein an odd-numbered subframe of subframes comprised by the second message comprises authentication information on the odd-numbered subframe, and an even-numbered subframe of the subframes comprised by the second message comprises authentication information on a concatenation or an exclusive-or of the even-numbered subframe and a subframe corresponding to the even-numbered subframe of subframes comprised by the first message.

* * * * *